US007988276B2

(12) United States Patent
Nakazawa et al.

(10) Patent No.: US 7,988,276 B2
(45) Date of Patent: Aug. 2, 2011

(54) INK JET PRINTING METHOD AND INK JET PRINTING APPARATUS

(75) Inventors: Koichiro Nakazawa, Tokyo (JP); Takuei Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 11/281,393

(22) Filed: Nov. 18, 2005

(65) Prior Publication Data

US 2006/0109322 A1 May 25, 2006

(30) Foreign Application Priority Data

Nov. 19, 2004 (JP) ................................ 2004-336367

(51) Int. Cl.
*G01D 11/00* (2006.01)

(52) U.S. Cl. ............ 347/100; 347/96; 347/95; 347/101; 347/31

(58) Field of Classification Search .............. 347/29–33, 347/22, 95, 96, 100, 101
See application file for complete search history.

(56) References Cited

U.S. PATENT DOCUMENTS 5,428,383 A 6/1995 Shields et al. .................. 347/96
5,488,402 A 1/1996 Shields et al. .................. 347/96
5,718,020 A 2/1998 Harrison et al. ................ 24/633
5,976,230 A 11/1999 Askeland et al. .......... 106/31.27
6,084,006 A 7/2000 Kashiwazaki et al. ........ 523/160
6,162,510 A 12/2000 Kashiwazaki et al. ........ 427/511
6,178,009 B1 1/2001 Yamada et al. ................ 358/1.9
6,203,604 B1 3/2001 Kashiwazaki et al. ....... 106/31.5
6,248,482 B1 6/2001 Kashiwazaki et al. ............ 430/7
6,309,062 B1 10/2001 Hickman et al. ................ 347/96
6,464,349 B1 10/2002 Moriyama et al. ............ 347/101
6,659,601 B2 12/2003 Goto et al. ..................... 347/100
6,729,718 B2 5/2004 Goto et al. ..................... 347/100
6,833,158 B2 12/2004 Suzuki et al. ................. 427/149

(Continued)

FOREIGN PATENT DOCUMENTS

JP 56-89595 7/1981

(Continued)

OTHER PUBLICATIONS

Aug. 31, 2010 Japanese Official Action in Japanese Patent Appln. No. 2005-333991.

*Primary Examiner* — Manish S Shah

(74) *Attorney, Agent, or Firm* — Fitzpatrick, Cella, Harper & Scinto

(57) ABSTRACT

An ink jet printing apparatus is provided which can produce an image in good condition without contaminating the interior of the printing apparatus or the back of the print medium if the "marginless printing" using an ink that tends to coagulate is performed. To that end, a step is provided which applies to the ink absorber the coagulation inhibiting liquid that inhibits a colorant contained in the ink from coagulating. This suppresses the coagulation of the colorant on the surface of the absorber, allowing the colorant to quickly soak into the absorber. Therefore, the colorant is prevented from depositing on the absorber surface, alleviating the problems associated with the colorant deposit.

6 Claims, 16 Drawing Sheets

U.S. PATENT DOCUMENTS

| | | | | |
|---|---|---|---|---|
| 6,964,466 | B1 | 11/2005 | Kodama et al. | 347/36 |
| 7,008,671 | B2 | 3/2006 | Ishikawa et al. | 427/152 |
| 7,090,719 | B2 | 8/2006 | Ishikawa et al. | 106/31.49 |
| 2003/0030692 | A1* | 2/2003 | Uchida | 347/35 |
| 2003/0151639 | A1* | 8/2003 | Takahashi | 347/36 |
| 2003/0196568 | A1* | 10/2003 | Miyamoto et al. | 106/31.43 |
| 2004/0141036 | A1 | 7/2004 | Ishikawa | 347/97 |
| 2004/0189767 | A1 | 9/2004 | Kodama et al. | 347/101 |
| 2005/0041081 | A1* | 2/2005 | Horii et al. | 347/95 |
| 2005/0078147 | A1 | 4/2005 | Kodama et al. | 347/36 |
| 2005/0122384 | A1 | 6/2005 | Kodama et al. | 347/104 |
| 2005/1019144 | | 9/2005 | Ishikawa et al. | 428/32.34 |
| 2006/0066667 | A1 | 3/2006 | Kodama et al. | 347/36 |
| 2006/0075584 | A1 | 4/2006 | Ishikawa et al. | 8/478 |
| 2006/0137570 | A1 | 6/2006 | Osumi et al. | 106/31.27 |
| 2006/0191440 | A1 | 8/2006 | Ishikawa et al. | 106/31.46 |
| 2006/0194056 | A1 | 8/2006 | Nagashima et al. | 428/403 |
| 2006/0194897 | A1 | 8/2006 | Kawabe et al. | 523/160 |

FOREIGN PATENT DOCUMENTS

| | | | | |
|---|---|---|---|---|
| JP | 63-29971 | | | 2/1988 |
| JP | 64-9279 | | | 1/1989 |
| JP | 64-63185 | | | 3/1989 |
| JP | 5-202328 | | | 8/1993 |
| JP | 6-106841 | | | 4/1994 |
| JP | 9-11850 | | | 1/1997 |
| JP | 10-128964 | | | 5/1998 |
| JP | 11-227229 | | | 8/1999 |
| JP | 11-334101 | | | 12/1999 |
| JP | 11-343441 | | | 12/1999 |
| JP | 2000-351205 | | | 12/2000 |
| JP | 3227339 | | | 8/2001 |
| JP | 2003-266664 | A | | 9/2003 |
| JP | 2003266664 | A | * | 9/2003 |

* cited by examiner

1 μS AFTER

2 μS AFTER

INK JET PRINTING METHOD AND INK JET PRINTING APPARATUS

BACKGROUND OF THE INVENTION

1. Field of the Invention

The present invention relates to an ink jet printing apparatus which forms an image by applying to a print medium a coloring material that coagulates under a predetermined condition. More specifically, the present invention relates to an ink jet printing method and printing apparatus that realizes a “marginless printing” by which a print medium is printed with an image without blank edges.

2. Description of the Related Art

As office equipment such as computers, word processors and copying machines advance, a growing number of printing apparatuses for outputting information from these equipment has become available on the market. The printing apparatus employing an ink jet printing system in particular has an advantage of being able to reduce the size of a print head easily, print an image at high resolution and high speed and print on plain paper without requiring special processing on the paper. Other advantages include low running cost, low noise and a relative ease with which a full color printing can be realized using multiple color inks. It has therefore found a wide range of applications, including personal users.

Such a widespread use can lead to the user making new demands on the ink jet printing apparatus. In recent years in particular, there are growing calls for increased image fastness such as waterfastness and lightfastness while maintaining a high color saturation. One method of enhancing the image fastness is to make some improvements on the print medium as dedicated paper. However, to stably maintain a high image fastness of various kinds of print mediums including plain paper, it is more effective to provide an ink itself with some features to achieve the above objective. For this reason, recent years have seen many novel inks developed and their applications proposed.

For example, Japanese Patent Application Laid-open No. 11-227229 (1999) discloses, in addition to the conventionally used dye inks, the development of inks containing pigments as coloants materials and a variety of printing methods using such inks. The inks containing pigments tend to stay on the surface of a print medium with the colorants in a coagulated state, when compared with inks containing dyes as colorants. Thus, the pigment colorants have features of a high color saturation which is not easily faded by sunlight and ozone. To take advantage of both the superiority of the pigment ink and the superiority of the dye ink, the above-cited reference discloses a method that selectively uses these different kinds of inks according to the kind of print medium used and the kind of image to be output. For example, the above document describes that a pigment-based black ink with low penetrability and dye-based color inks with high penetrability are prepared and that a black image may be printed with the black ink or with a combination of different color inks, depending on the kind of print medium and the kind of image to be printed. The cited reference also describes printing color inks first, followed by a black ink overlapping the first printed color inks.

Other methods for enhancing the color saturation and the image fastness propose using a reaction liquid that reacts with color inks containing colorants to make the colorants insoluble or coagulate. For example, Japanese Patent Application Laid-open No. 56-89595 (1981) discloses a method which applies a polymer solution, such as carboxymethyl cellulose, polyvinyl alcohol and polyvinyl acetate, to the print medium before printing and then prints coloring inks. Japanese Patent Application Laid-open No. 63-29971 (1988) discloses a method that involves applying to a print medium a liquid containing an organic compound having two or more cationic groups in one molecule and then printing coloring inks containing anionic dye. Japanese Patent Application Laid-open No. 64-9279 (1989) discloses a method that first applies an acidic liquid containing succinic acid to a print medium and then prints coloring inks. Japanese Patent Disclosure No. 64-63185 describes a method that applies to a print medium a liquid that makes a dye insoluble, before printing coloring inks containing the dye. Japanese Patent Application Laid-open No. 5-202328 (1993) describes a method which applies a reaction liquid containing polyvalent metal ion before printing coloring inks.

Further, Japanese Patent Application Laid-open Nos. 6-106841 (1994), 9-11850 (1997), 11-334101 (1999) and 11-343441 (1999), and U.S. Pat. Nos. 5,428,383, 5,488,402 and 5,976,230 disclose a set of a black ink and coloring inks in which at least one of the color inks exhibits a mutual reactivity with the black ink, with other inks showing no reactivity with the black ink.

All these methods listed above that use a reaction liquid are characterized in that the reaction liquid chemically reacts with the coloring inks containing colorants to coagulate the coloring inks. That is, many ink jet printing apparatus of recent years, whether they use pigments or dyes or whether they require a reaction liquid to induce coagulation, have the colorants coagulate, remain and settle on the surface of a print medium, thereby realizing a satisfactory color saturation and image fastness.

There are also growing calls for a high image quality and a handling that match those of silver salt pictures. In recent years, an increasing number of printing apparatus are appearing on the market which can perform the so-called “marginless printing” by which an image is printed to the edges of the print medium.

In the conventional ink jet printing apparatus, forming an image to the edges of the print medium poses many problems to the apparatus. One of the problems is that ink that has overrun the edges of the print medium may contaminate the interior of the printing apparatus, further contaminating sheets of print medium as they are fed into the printing apparatus. Since the ink is absorbed also at the edges of the print medium, the accuracy with which the print medium is transported degrades, which is likely to result in the print medium being jammed in the apparatus.

However, a construction and method to solve the above problems accompanying the “marginless printing” have already been proposed, for example, in Japanese Patent Application Laid-open Nos. 10-128964 (1998) and 2000-351205. As a construction to realize the “marginless printing” on side edges of a print medium, Japanese Patent Application Laid-open No. 10-128964 (1998) discloses an “ink jet printing apparatus which comprises: a guide means set movable, according to the size of the print medium, in a direction perpendicular to the direction of transport of the print medium and installed inside of the side edges of the print medium; and an ink receiving means installed outside of and adjacent to the guide means in a direction perpendicular to the print medium transport direction to receive ink from the print head.” That is, when the “marginless printing” is performed on print mediums of various widths, ink ejected outside of the side edges of the print medium can be received by the ink receiving means, thereby minimizing the contamination of the interior of the printing apparatus.

Japanese Patent Application Laid-open No. 2000-351205 discloses a construction to realize the "marginless printing" with respect to front and rear ends of a print medium. In this construction, a platen surface that restricts the position of the print medium during printing is formed with a hole and ink ejected outside the front or rear ends of the print medium during the printing operation is led into the hole, in which an absorbent is installed to absorb wasted ink. The mechanism to collect ink ejected outside the edges of the print medium without contaminating the interior of the apparatus is one of the important factors in realizing the "marginless printing."

In the ink jet printing apparatus, however, it is found that executing the "marginless printing" by using the above-described ink that accelerates coagulation of colorants can cause another problem. This is explained in the following.

When a coagulating ink is used, a quick absorption of ink as with common dye inks becomes difficult to achieve. Such an ink has colorants not dissolved in water and ionized as with dyes but dispersed in a liquid, so when it adheres to the absorbent, it is not absorbed as quickly as water. The phenomenon and problems that the inventors of this invention have found in the process of executing the "marginless printing" using pigment inks as an example of coagulating inks and also dye inks will be explained as follows.

FIG. 13 shows a dye ink as it is ejected onto an ink absorber. In the figure, denoted by 1 is a print head. Ink ejected from the print head 1 is a conventionally known water-based dye ink for use in ink jet printing. The dye used may include water-soluble dyes such as a direct dye, an acid dye and a basic dye. Denoted by 2 is an ink absorber which may use any type of commonly known porous material. The ink absorber may be formed, for example, by using fibers of cellulose, rayon, acrylic, polyurethane or polyester singly or in combination and forming these fibers into fibrils or by subjecting the fibers to a hydrophilic treatment and laminating them in layers. The ink absorber may also be formed of porous polyethylene and melamine foam. If such an ink absorber 2 is used in combination with the dye ink, the ink will quickly be absorbed in the ink absorber, with the ink soaking into the interior of the ink absorber 2 as shown shaded in the figure.

FIG. 14 shows a pigment ink as it is ejected onto an ink absorber similar to the above. Any conventionally known pigment ink for use in ink jet printing may be used. In a combination of such a pigment ink and the ink absorber, a part of ink components such as liquid medium penetrates into the ink absorber 2. However, the pigment particles remain on the ink absorber 2 forming a deposit as an ink component left unabsorbed. That is, as shown shaded in the figure, the ink separates into a portion that penetrates into the absorber and a portion that deposits on the ink absorber and settles there.

While in the above explanation a pigment ink has been taken for example, such an ink behavior in the absorber can similarly be observed in any ink with a coagulating colorant. For example, the same also applies even to an ink composed of a mixture of dye and pigment in which the pigment constitutes a main colorant with another colorant such as a highly soluble dye mixed with it for color adjustment. The similar effect can also be produced even when a dye is used as a colorant, by using a reaction liquid that reacts with the dye to accelerate the coagulation of the colorant.

In the absorber during the execution of the "marginless printing", the ink deposit on the surface of the absorber progressively increases as the number of printed sheets and the power-on time increase. Once the surface of the absorber is covered with the deposit, ink droplets landing on the absorber thereafter fail to be received in the absorber. As a result, ink bounced off the absorber surface will contaminate the interior of the printing apparatus. Further, when a large number of sheets are "marginless-printed", it is found that the ink deposit reaches the print medium transport path, contaminating the back of the print medium. Furthermore, it is also found that the ink deposit may protrude even into the print medium transport path, touching the end of the print medium, which in turn may result in a transport failure.

Because of various problems described above, a satisfactory "marginless printing" is difficult to achieve in the ink jet printing apparatus that uses inks with a coagulating property.

SUMMARY OF THE INVENTION

The present invention has been accomplished to solve the above problems and its objective is to provide an ink jet printing apparatus that can produce a satisfactory image without contaminating the interior of the printing apparatus or the back of the print medium even when performing the "marginless printing".

A first aspect of the present invention is an ink jet printing method for printing an image on a print medium by ejecting ink containing a colorant from nozzles, the ink jet printing method comprising: a step of applying a coagulation inhibiting liquid to an ink absorber, the coagulation inhibiting liquid inhibiting a coagulation of the colorant contained in the ink, the ink absorber receiving the ink ejected outside the print medium; and a printing step of ejecting the ink toward the print medium.

A second aspect of the present invention is an ink jet printing method for printing an image on a print medium by ejecting ink containing a colorant from nozzles, the ink jet printing method comprising: a step of setting a marginless print mode, the marginless print mode performing printing without leaving a margin at least one edge portion of the print medium; a step of applying a coagulation inhibiting liquid to an ink absorber in the marginless print mode, the coagulation inhibiting liquid inhibiting a coagulation of the colorant contained in the ink, the ink absorber receiving the ink ejected outside the print medium; and a printing step of ejecting the ink toward the print medium.

A third aspect of the present invention is an ink jet printing method for forming an image on a print medium by ejecting an ink containing a colorant from nozzles, the ink jet printing method comprising: a step of applying a coagulation inhibiting liquid to an ink absorber, the coagulation inhibiting liquid inhibiting a coagulation of the colorant contained in the ink, the ink absorber receiving the ink ejected outside the print medium; a step of applying a reaction liquid to the print medium, the reaction liquid accelerating the coagulation of the colorant; and a printing step of ejecting the ink toward the print medium.

A fourth aspect of the present invention is an ink jet printing apparatus for printing an image on a print medium by ejecting ink containing a colorant from nozzles, the ink jet printing apparatus comprising: an ink absorber that receives the ink ejected outside the print medium when performing a printing operation without leaving a margin at least one edge of the print medium; and applying means that applies a coagulation inhibiting liquid to the ink absorber, the coagulation inhibiting liquid inhibiting a coagulation of the colorant contained in the ink.

A fifth aspect of the present invention is an ink jet printing apparatus for printing an image on a print medium by ejecting ink containing a colorant from nozzles, the ink jet printing apparatus comprising an ink absorber that receives the ink ejected outside the print medium when performing a printing operation without leaving a margin at least one edge of the print medium; applying means that applies a coagulation inhibiting liquid to the ink absorber, the coagulation inhibiting liquid inhibiting a coagulation of the colorant contained in the ink; and applying means that applies a reaction liquid to the print medium, the reaction liquid accelerating the coagulation of the colorant.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, an embodiment of this invention will be described in detail as follows.

Figure 1:
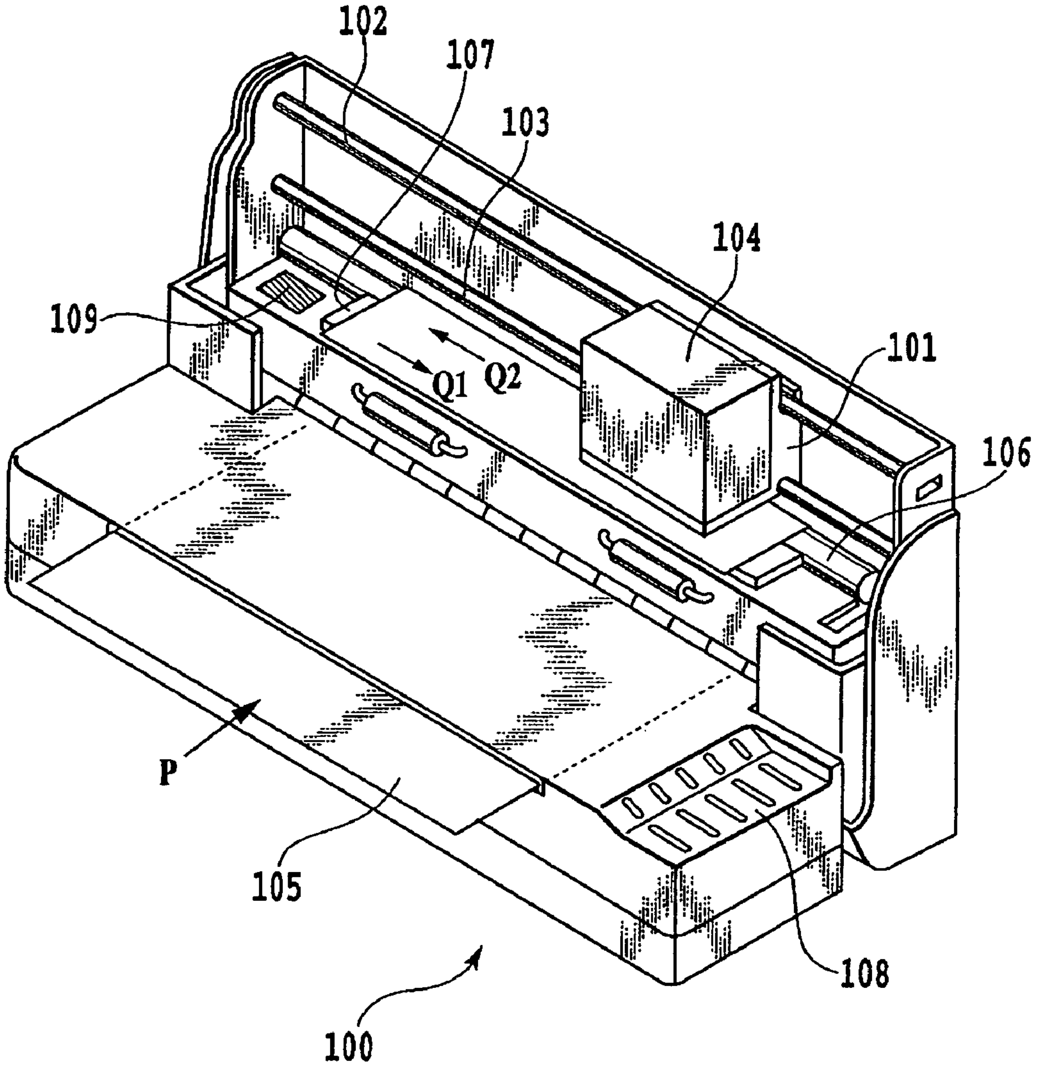
FIG. 1 is a perspective view of a serial type ink jet printing apparatus applicable to this invention.

FIG. 1 is a perspective view of a serial type ink jet printing apparatus applicable to this invention. A print medium 105 inserted at a paper feed position in the ink jet printing apparatus 100 is fed by a transport roller 106 in a direction of arrow P to a printable area of a print head 104. Under the print medium 105 in the printable area is provided a platen 107 which supports the print medium 105 from below in an area where the print head 104 executes the printing operation. It is noted, however, that a hole is formed at a position directly below the printing unit. In the hole is installed an ink absorber which absorbs ink ejected outside the edges of the print medium during the "marginless printing". Details of the printing unit will be described later.

A carriage 101 is movable along two guide shafts 102, 103 and reciprocally scans over the printing area in a main scan direction Q1, Q2. The print head 104 mounted on the carriage 101 has a nozzle group capable of ejecting a plurality of color inks (KCMY), a nozzle group to eject a coagulation inhibiting liquid (P) that inhibits colorants contained in the inks from coagulating, and a nozzle group to eject a reaction liquid (S) that accelerates the coagulation of the colorants contained in the inks. These nozzle groups have their nozzle openings face down in the figure. Further, the print head 104 includes ink tanks accommodating different color inks to be supplied to the respective ink nozzle groups, a coagulation inhibiting liquid tank accommodating the coagulation inhibiting liquid to be supplied to the coagulation inhibiting liquid nozzle group, and a reaction liquid tank accommodating the reaction liquid to be supplied to the reaction liquid nozzle group. The operation repetitively alternates a main scan, by which while the carriage 101 travels in Q1 or Q2 direction, the print head 104 ejects at least one ink to form an image on the print medium, and a sub scan by which the print medium 105 is fed a predetermined distance. With this process, an image is successively formed on the print medium. During the main scan the print head 104 also ejects the coagulation inhibiting liquid and the reaction liquid as required. Denoted by 108 is a switch unit and a display unit. The switch unit is used to turn on or off the power of the printing apparatus and to set a variety of print modes (e.g., a marginless print mode described later). The display unit displays a status of the printing apparatus.

Figure 2:
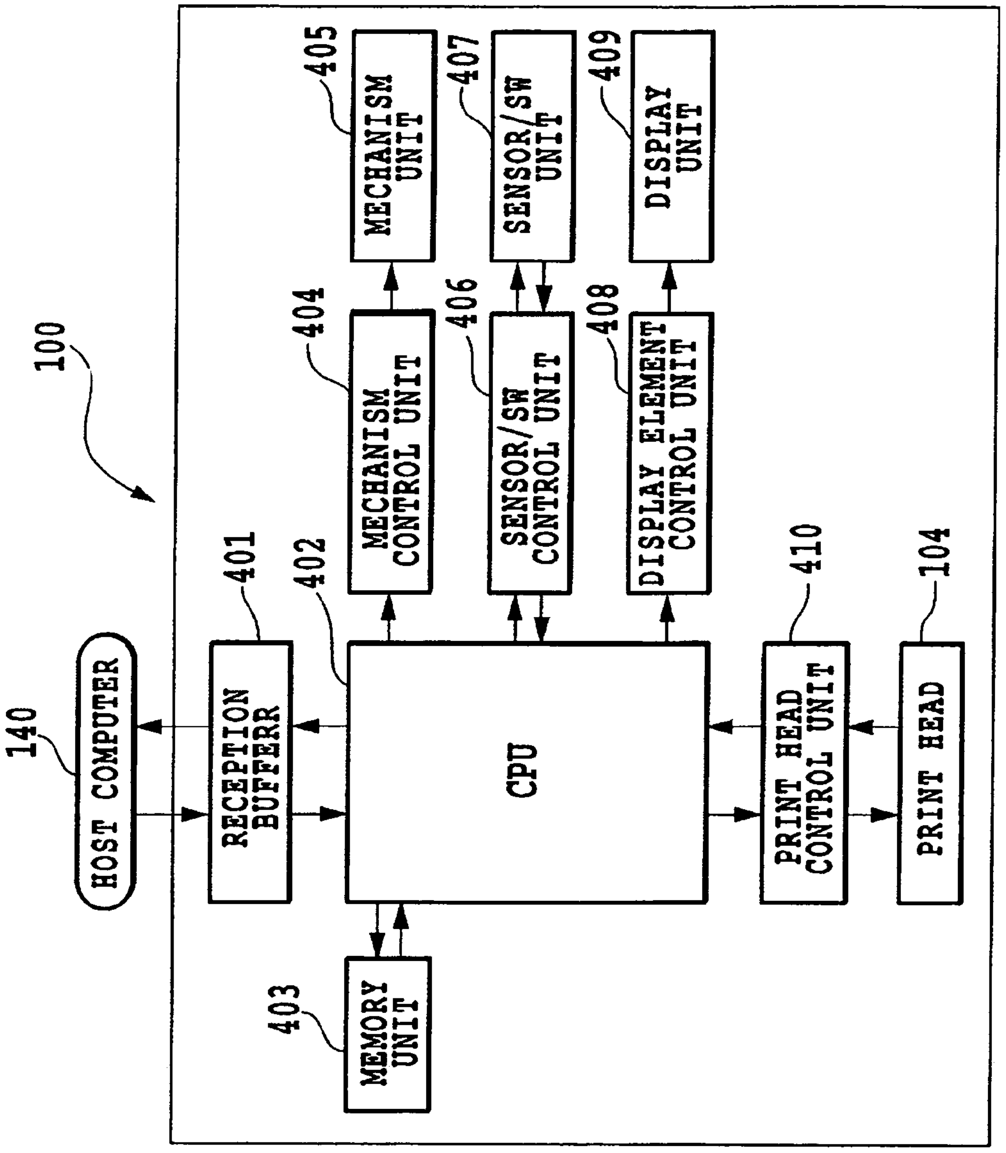
FIG. 2 is a block diagram showing a configuration of a control system for the ink jet printing apparatus applicable to this invention.

FIG. 2 is a block diagram showing a configuration of a control system in the ink jet printing apparatus 100 of FIG. 1. In the figure, a host computer 140 is connected to the printing apparatus 100 and generates image data to be transferred to the printing apparatus. Programs running on an operating system of the host computer 140 include applications and a printer driver. The applications execute processing to generate image data to be used in the printing apparatus. This image data or data before being edited can be taken into the computer through a variety of media. The data thus taken in is displayed on a monitor of the host computer where it is edited and processed by the applications to generate image data R, G, B, for example. According to a request for printing, this image data is transferred to the printer driver. The printer driver converts the received RGB image data into color-separated data corresponding to combinations of inks—cyan, magenta, yellow and black—that reproduce colors represented by this data. Then, The CMYK color-separated data are each subjected to γ correction processing and half-toning processing to produce CMYK multivalued image data which is then transferred to the printing apparatus 100.

A receiving buffer 401 in the printing apparatus 100 receives the CMYK multivalued image data from the host computer 140 and transfers them to a CPU 402. Information as to whether data has been received correctly or not and information representing the operating state of the printing apparatus 100 are also notified to the host computer 140 via the receiving buffer 401. The CPU 402 controls various parts in the printing apparatus. The CMYK multivalued image data received by the receiving buffer 401 is converted under the control of the CPU 402 into CMYK binary image data which is transferred to a memory unit 403 where it is stored. The memory unit 403 also stores a control program that controls the printing operation and recovery operation performed in the ink jet printing apparatus.

This printing apparatus uses a reaction liquid (S) as necessary. The objective for the use of the reaction liquid (S) is to coagulate the colorant contained in the ink, so it only needs to be applied at least where the ink is applied. When the reaction liquid is used, it is appropriate to generate binary ejection data for the reaction liquid from a logical OR of the CMYK binary image data and store it in the memory unit 403. Considering the fact that the reaction liquid droplet, when it lands on the print medium, somewhat spreads, it is not always necessary to apply the reaction liquid to all ink application positions. For example, as disclosed in Japanese Patent No. 3227339, the logical OR data of CMYK binary image data may be thinned to generate binary ejection data for the reaction liquid so as to apply the reaction liquid to only a part of the ink application positions, and the binary ejection data thus generated may be stored in the memory unit 403. It is also possible to apply the reaction liquid to the entire surface of the print medium. In this configuration, the binary ejection data to apply the reaction liquid to the entire surface of the print medium is prepared in advance and stored in the memory unit 403.

The coagulation inhibiting liquid (P) needs only to be applied to the ink absorber, as described later. Thus, ejection data for applying the liquid to the ink absorber is preferably prepared in advance and stored in the memory unit 403.

A mechanism control unit 404 controls a mechanism unit 405 such as carriage motor and transport motor according to an instruction from the CPU 402. A sensor/SW control unit 406 transfers a signal from a sensor/SW unit 407 made up of various sensors and switches to the CPU 402. A display element control unit 408 controls a display unit 409 made up of LEDs and liquid crystal display elements on display panel group according to an instruction from the CPU 402. A print head control unit 410 control the print head 104 according to an instruction from the CPU 402. The print head control unit 410 also detects temperature information and others representing the state of the print head 104 and transfers them to the CPU 402.

Figure 3:
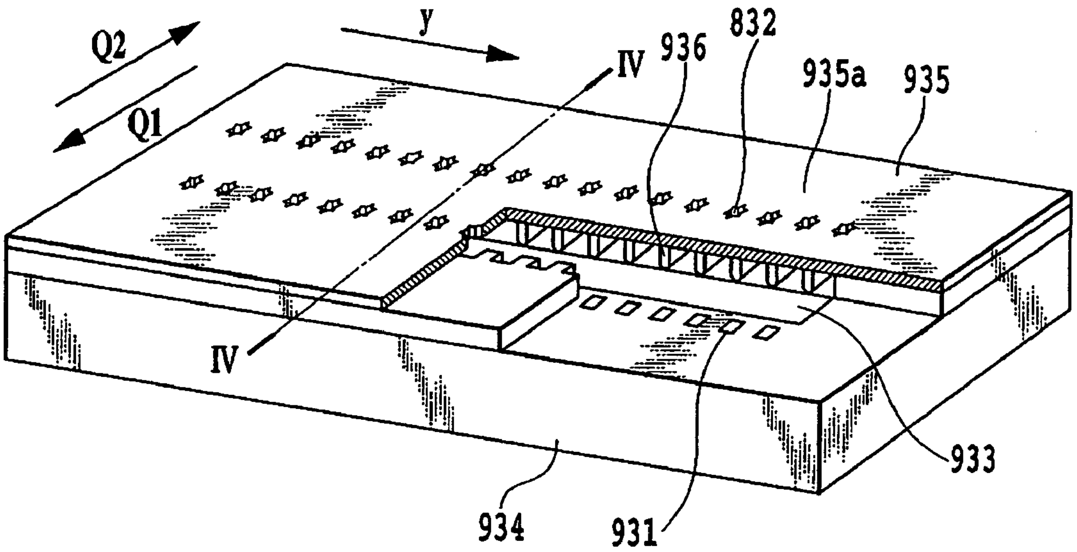
FIG. 3 is a schematic perspective view showing an essential portion of an ink jet print head applicable to the embodiment of this invention.

FIG. 3 is a perspective view schematically showing an essential part of an ink jet print head applicable to this embodiment. In the figure, denoted by 934 is a substrate which, in this embodiment, is formed of glass, ceramic, plastic or metal and such like. The material of the substrate is not an essential point of this invention and is not limited to any particular material as long as the substrate can function as part of a flow path forming member and as a support member for ink ejection energy generation elements and for a material layer forming liquid paths and ink ejection nozzles described later. In this embodiment, a silicon substrate (wafer) is used.

The substrate 934 is formed with ink ejection nozzles as by laser beam or by an exposure device such as MPA (mirror projection aligner) using an orifice plate (nozzle plate) described later made of a photosensitive resin.

The substrate 934 is also formed with a plurality of electrothermal transducers (also referred to as heaters) 931 and with an ink supply port 933 in the form of an elongate groove that also functions as a common liquid chamber. The heaters 931, the thermal energy generation means, are arranged longitudinally on both aides of the ink supply port 933 at intervals corresponding to 600 dpi (dots/inch) for example. The two columns of heaters are staggered a half pitch from each other in a y direction and therefore they together can print at a density of 1200 dpi in the y direction.

On the substrate 934 are provided ink path walls 936 to introduce ink to where heaters are located. Further on the ink path walls 936 is placed an orifice plate 935 which has nozzles 832 for ejecting ink droplets by an energy applied to individual heaters. The orifice plate 935 is water-repellent finished on the nozzle surface side (935*a*). To each of the heaters 931 is applied a pulse voltage at a drive frequency of 10 kHz to be able to eject ink every about 100 μsec.

FIGS. 4-11 are head cross sections showing how an actual ink ejection operation is performed with elapse of time. Here, the cross sections of the print head are taken along the IV-IV line of FIG. 3.

Figure 4:
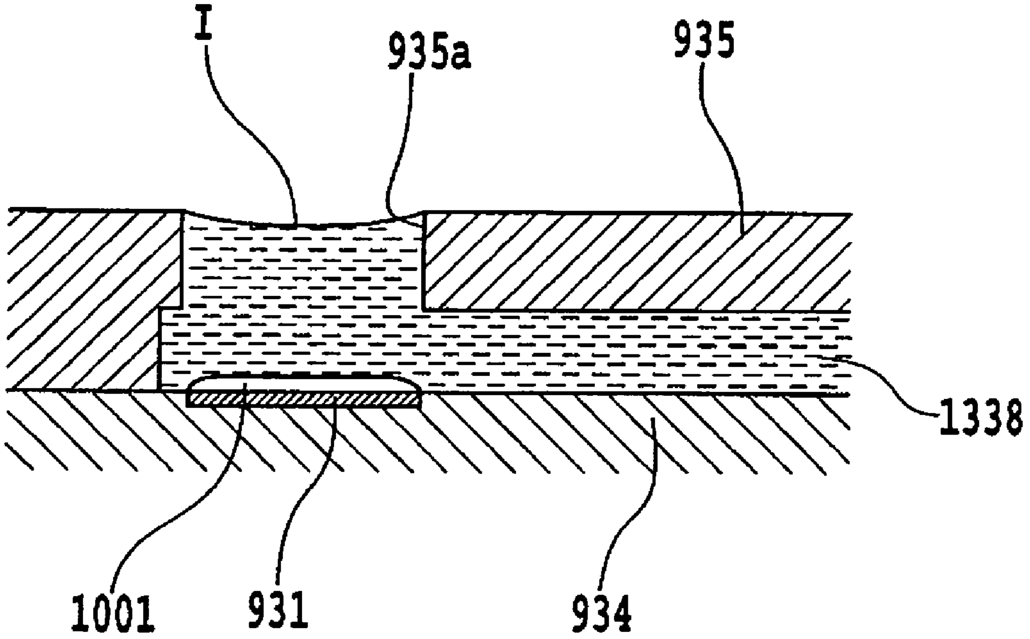
FIG. 4 is a cross-sectional view of the head showing an ejection operation with an elapse of time.
Figure 5:
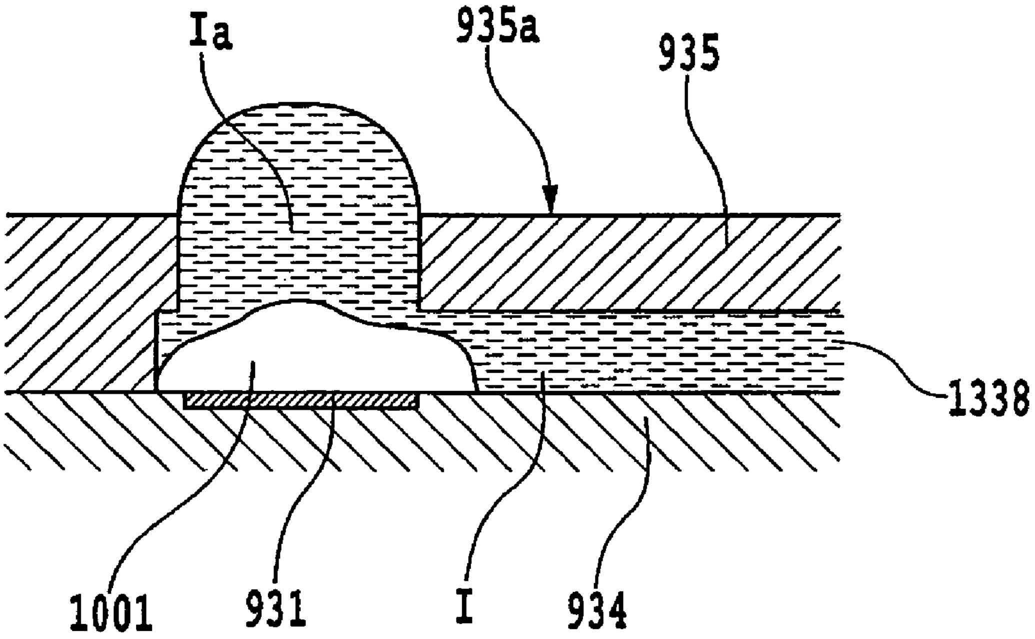
FIG. 5 is a cross-sectional view of the head showing an ejection operation with an elapse of time.
Figure 6:
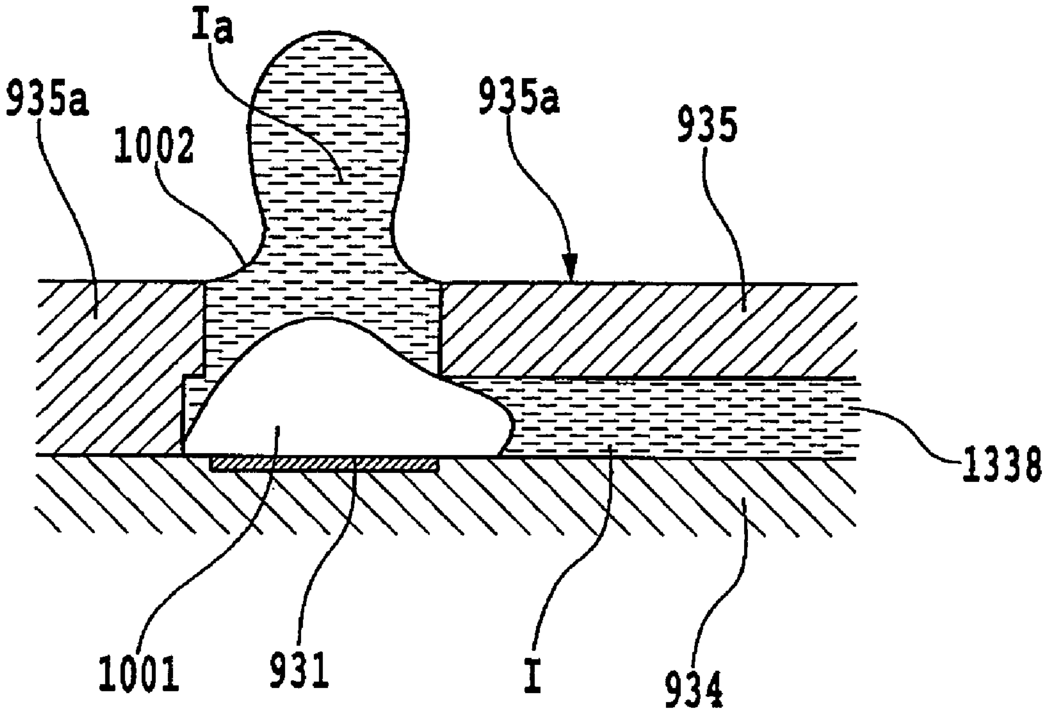
FIG. 6 is a cross-sectional view of the head showing an ejection operation with an elapse of time.
Figure 7:
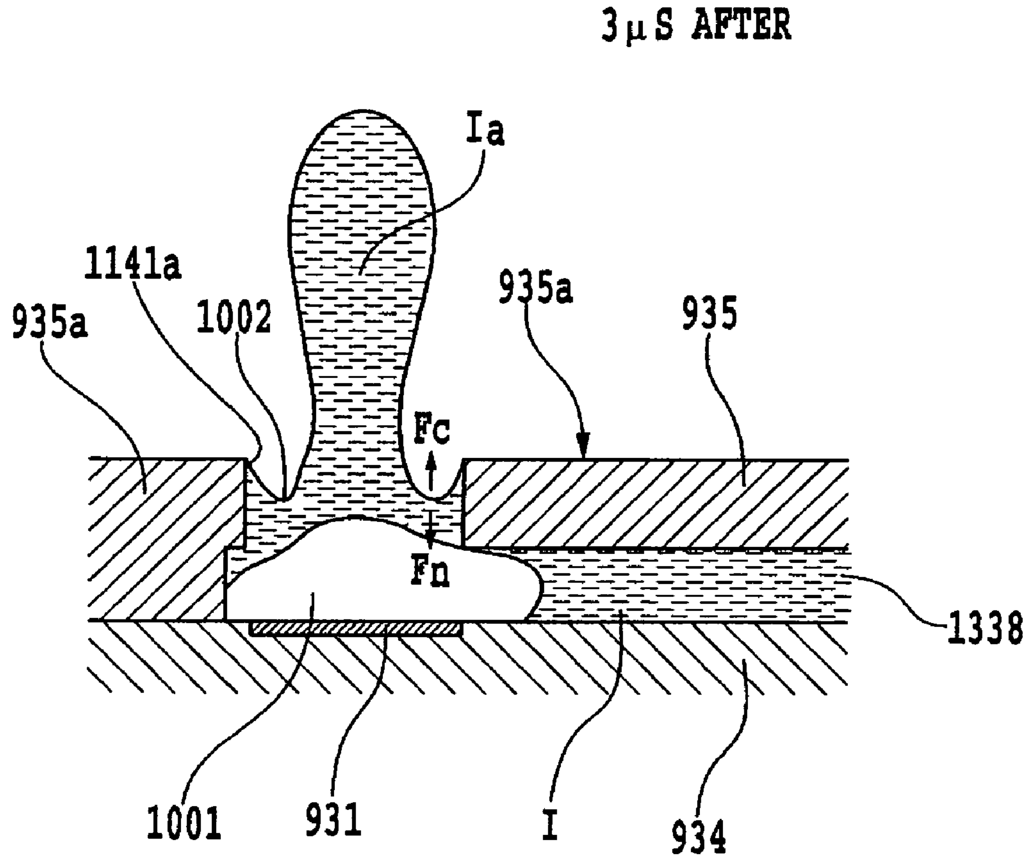
FIG. 7 is a cross-sectional view of the head showing an ejection operation with an elapse of time.
Figure 8:
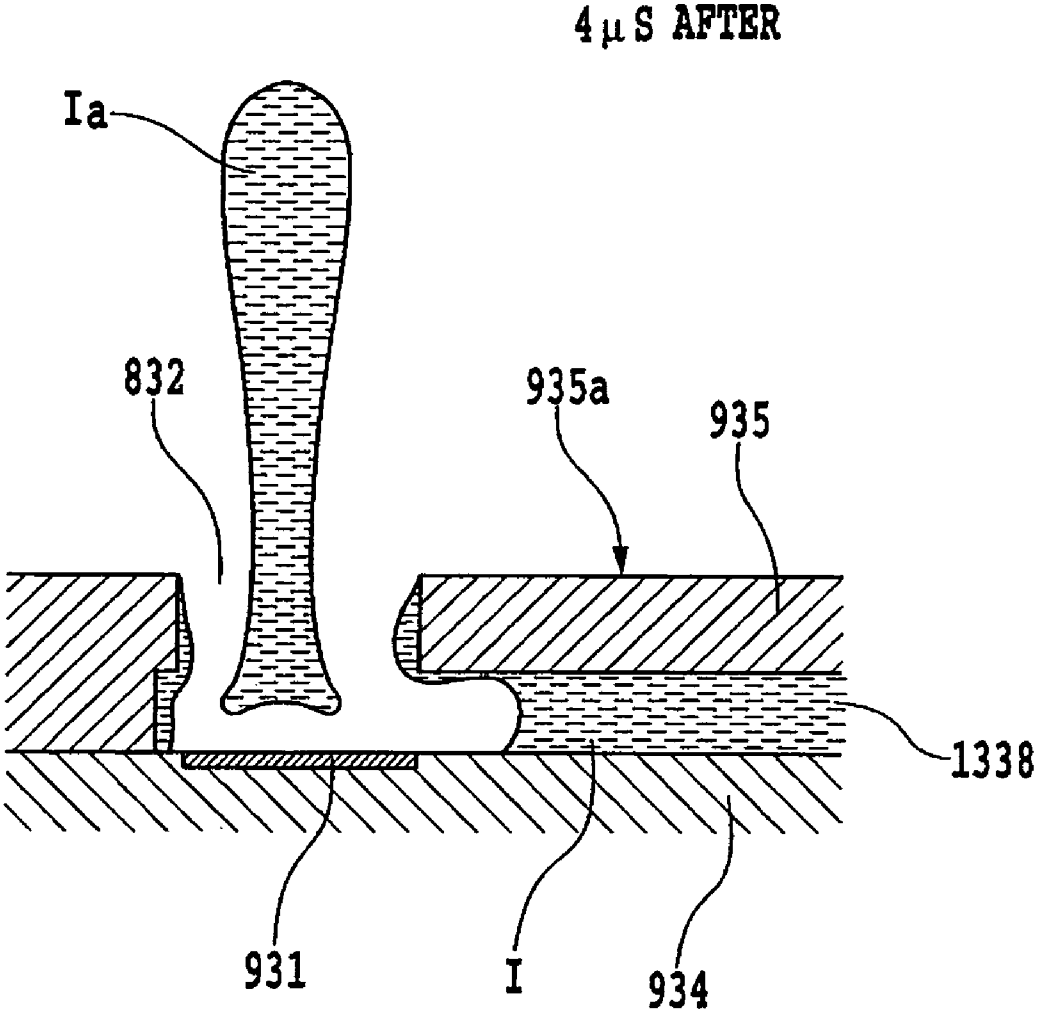
FIG. 8 is a cross-sectional view of the head showing an ejection operation with an elapse of time.
Figure 9:
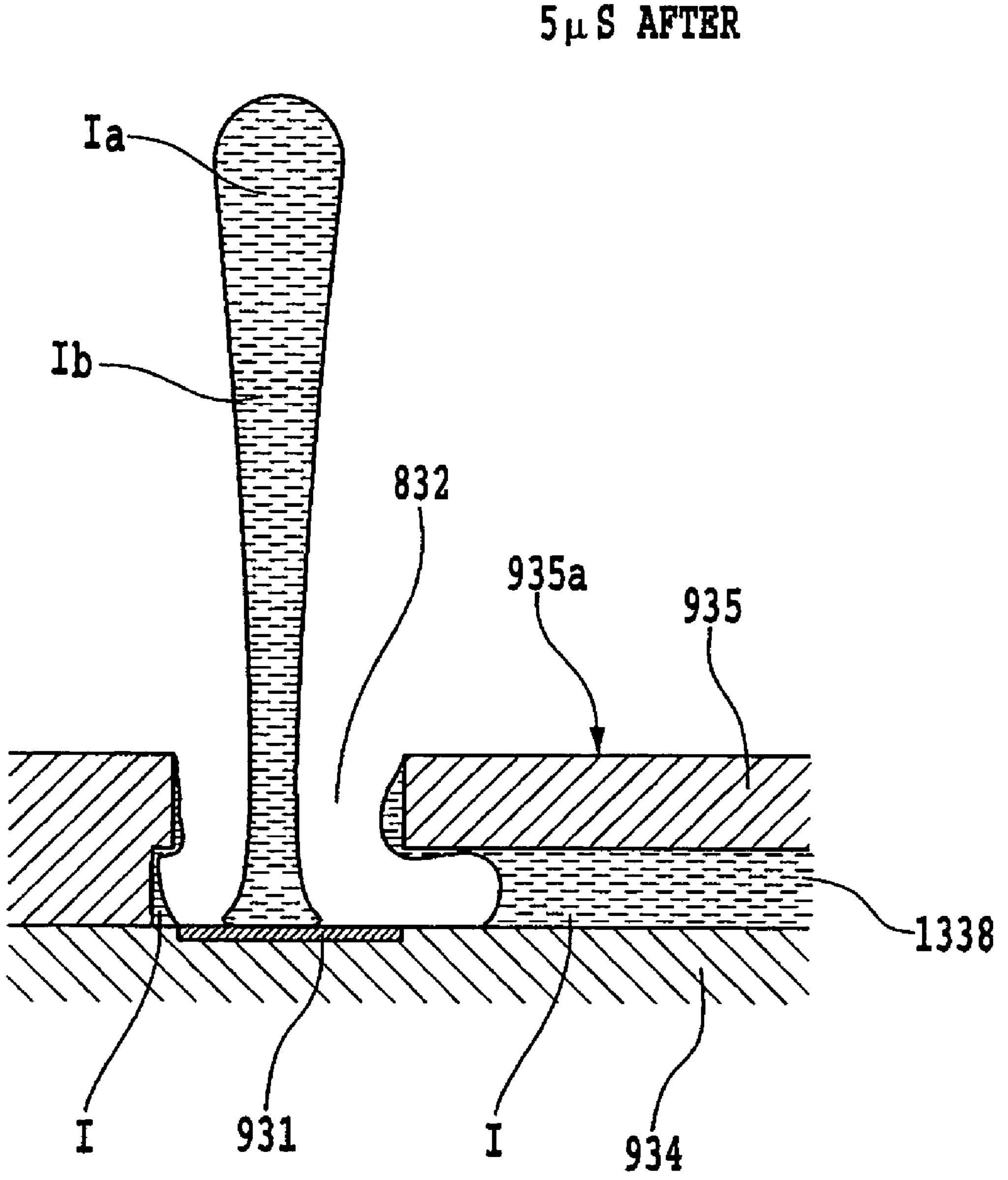
FIG. 9 is a cross-sectional view of the head showing an ejection operation with an elapse of time.
Figure 10:
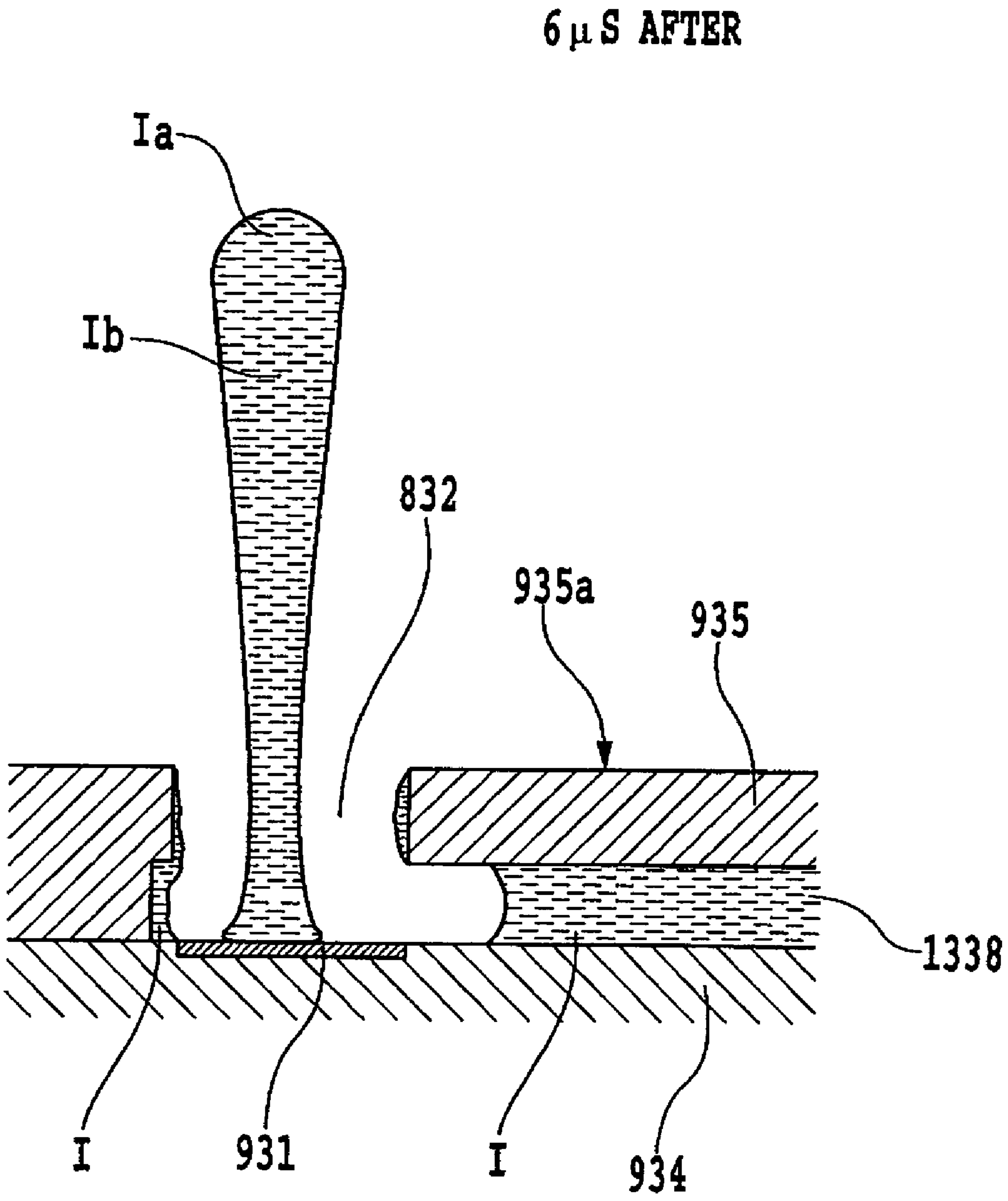
FIG. 10 is a cross-sectional view of the head showing an ejection operation with an elapse of time.
Figure 11:
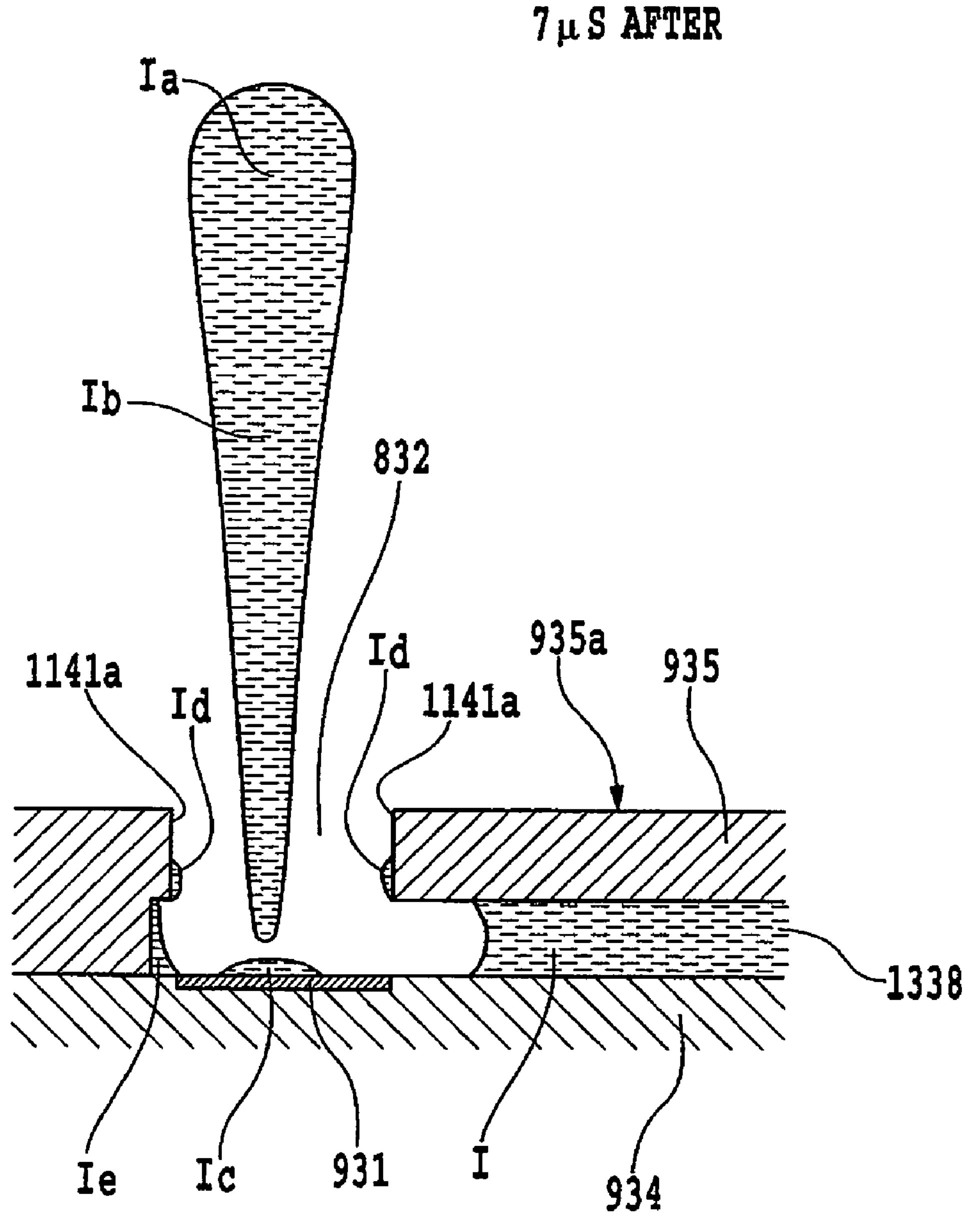
FIG. 11 is a cross-sectional view of the head showing an ejection operation with an elapse of time.

FIG. 4 shows a filmlike bubble being formed by the heater 931 as it is applied a pulse voltage. FIG. 5 shows a state about 1 μsec after the state of FIG. 4; FIG. 6 represents a state about 2 μsec later; FIG. 7 represents a state about 3 μsec later; FIG. 8 represents a state about 4 μsec later; FIG. 9 represents a state about 5 μsec later; FIG. 10 represents a state about 6 μsec later; and FIG. 11 represents a state about 7 μsec later. In the following explanation, words “drop or fall” or “allowed to fall” do not mean a fall in the gravitational direction but a movement toward the heater irrespective of the direction in which the head is mounted.

When the heater 931 is energized according to a print signal, a bubble 1001 is formed in a liquid path 1338 above the heater 931. The bubble 1001 rapidly expands as shown in FIG. 5 1 μsec later and FIG. 6 2 μsec later. When the bubble 1001 expands to its maximum volume, its height exceeds the nozzle surface 935*a*. The pressure of the bubble 1001 at this time is several to a dozen times smaller than the atmospheric pressure.

About 2 μsec after the generation of the bubble 1001, the bubble 1001 begins to decrease in volume and almost at the same time a meniscus 1002 begins to form. The meniscus 1002, as shown in FIG. 7, retracts toward the heater 931.

The falling speed of the meniscus 1002 is faster than the contracting speed of the bubble 1001. Therefore, about 4 μsec after the generation of a bubble, the bubble 1001 communicates with the atmosphere near the bottom surface of the nozzle 832 (FIG. 8). At the same time, the ink Ia near the center axis of the nozzle 832 begins to fall toward the heater 931. This is because the ink Ia that was pulled back toward the heater 931 by the negative pressure of the bubble 1001 before it communicated with the atmosphere still retains the speed toward the heater 931 surface by inertia even after the bubble has communicated with the atmosphere.

The ink Ia falling toward the heater 931 reaches the surface of the heater 931 about 5 μsec after the generation of the bubble 1001 (FIG. 9). Then, the ink spreads over the surface of the heater 931 (FIG. 10). The ink that has spread over the surface of the heater 931 has a horizontal vector along the surface of the heater 931 but a vector in a direction perpendicular to the surface of the heater 931 vanishes. Thus, the ink tends to stay on the surface of the heater 931. A portion of the liquid somewhat above the heater surface, which retains a speed vector toward the ejection direction, is acted upon by a downward force.

Then, a portion Ib between the bottom part of ink that has spread over the surface of the heater 931 and the upper part of ink (main droplet) narrows and, about wee 7 μsec after the generation of the bubble 1001, the liquid portion Ib is cut off at the center of surface of the heater 931 (FIG. 11). As a result, the ink is separated into the main droplet Ia having a speed vector in the ejection direction and the ink Ic spread over the surface of the heater 931. The cut position of Ib is located preferably inside the liquid path 1338 and more preferably on the heater 931 side rather than nozzle 832 side.

The main droplet Ia thus generated is ejected from the central part of the nozzle 832 with no deviation in the ejection direction and lands at a target position on the print surface of the print medium. The ink Ic spread over the surface of the heater 931 stays on the heater surface and is not ejected.

Next, a pigment ink applicable to this embodiment will be explained. It is noted, however, that this invention is not limited to the example application of the pigment ink described below.

The pigment of the pigment ink used in this embodiment is 1-20% by weight of the total weight of the pigment ink and preferably 2-12 wt %. As a black pigment, carbon black may be used, which is made by the furnace method or channel method. It preferably has a first degree particle diameter of 15-40 mμ (nm), a BET method-based specific surface area of 50-300 $m^2$/g, a DBP absorbed oil volume of 40-150 ml/100 g, a volatile component of 0.5-10% and a pH value of 2-9. Products with the above characteristics available on the market include No. 2300, No. 900, MCF88, No. 33, No. 40, No. 45, No. 52, MA7, MA8, No. 2200B (these are from Mitsubishi Kasei), RAVEN1255 (Columbia make), REGAL400R, REGAL330R, REGAL660R, MOGUL L (these are from Cabot Corporation), Color Black FW1, Color Black FW18, Color Black 5170, Color Black S150, Printex 35, Printex U (these are from Degussa).

Yellow pigments on the market include, for example, C. I. Pigment Yellow 1, C. I. Pigment Yellow 2, C. I. Pigment Yellow 3, C. I. Pigment Yellow 13, C. I. Pigment Yellow 16, and C. I. Pigment Yellow 83.

Magenta pigments on the market include, for example, C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112, and C. I. Pigment Red 122.

Cyan pigments on the market include, for example, C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4, and C. I. Vat Blue 6. In addition to these pigments, newly manufactured pigments, such as self dispersion type pigments, can of course be used.

Any type of pigment dispersant may be used as long as it is water-soluble resin. It preferably has a weight-averaged molecular weight of 1,000-30,000 and more preferably 3,000-15,000. More specifically, pigment dispersants include: block copolymers composed of at least two or more monomers (at least one of which is a hydrophilic polymeric monomer), which are selected from among styrene, styrene derivatives, vinylnaphthalene, vinylnaphthalene derivatives, aliphatic alcohol ester of a, β-ethylenic unsaturated carboxylic acid, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and its derivatives; random copolymers; graft copolymers; or their salts. Further, natural resins such as rosin, shellac and starch may also be used in a preferable condition. These resins can be dissolved in a water solution of bases and are alkaline soluble resins. These water-soluble resins used as a pigment dispersant in the pigment ink preferably have a content of 0.1-5 wt % of the total weight of pigment ink.

In the case of a pigment ink containing the above pigments, the whole pigment ink is preferably adjusted to be neutral or alkaline. This improves the solubility of water-soluble resins used as a pigment dispersant and thus provides a pigment ink with an excellent long-term storage capability. In this case, however, since the alkaline liquid may corrode a variety of members used in the ink jet printing apparatus, it is desired that the pigment ink be adjusted in a pH range of 7-10. Possible pH adjusting agents include, for example, organic amines such as diethanolamine and triethanolamine, inorganic alkali agents such as hydroxides of alkaline metals, including sodium hydroxide, lithium hydroxide and potassium hydroxide, and organic acids and mineral acids. The above pigments and the water-soluble resins used as dispersants are dispersed or dissolved in a water-soluble medium.

In the pigment ink of this embodiment, the suitable aqueous liquid medium is a mixed solvent of water and water-soluble organic solvent. In this case, ion-exchanged water (deionized water) is preferably used, rather than commonly available water containing various ions.

The water-soluble organic solvents that are mixed with water include, for example, alkylalcohols with a carbon number of 1-4, such as methylalcohol, ethylalcohol, n-propylalcohol, isopropylalcohol, n-butylalcohol, sec-butylalcohol, and tert-butylalcohol; amides such as dimethyl formamide and dimethyl acetamide; ketones or ketoalcohols such as acetone and diacetone alcohol; ethers such as tetrahydrofuran and dioxane; polyalkyleneglycols such as polyethyleneglycol and polypropyleneglycol; alkyleneglycols with alkylene group having 2-6 carbon atoms, such as ethyleneglycol, propyleneglycol, butyleneglycol, triethyleneglycol, 1,2,6-hexanetriole, thiodiglycol, hexyleneglycol, and diethyleneglycol; glycerin; lower alkylethers of polyvalent alcohols such as ethyleneglycol monomethyl (or ethyl) ether, diethyleneglycol methyl (or ethyl) ether, and triethyleneglycol monomethyl (or ethyl) ether; and N-methyl-2-pyrrolidone, 2-pyrrolidone, and 1,3-dimethyl-2-imidazo-lidinone. Of these many water-soluble organic solvents, polyvalent alcohols such as diethyl eneglycol, and lower alkylethers of polyvalent alcohols such as diethyleneglycol and triethyleneglycol monomethyl (or ethyl) ether are suitably applied.

A content of the above water-soluble organic solvents in the pigment ink is generally in a range of 3-50 wt % of the total weight of the pigment ink and more preferably in a 3-40 wt % range. A water content is 10-90 wt % of the total weight of the pigment ink and preferably 30-80 wt %.

To provide the pigment ink of this embodiment with desired properties, surfactant, antifoaming agent and preservative may be added to the pigment ink as required. It is strongly desired that a proper amount of surfactant that facilitates a quick soaking of a liquid component of the pigment ink into the print medium be added. The amount to be added is 0.05-10 wt % Or more preferably 0.5-5 wt %. As for anionic surfactant, commonly available surfactants can suitably be used, such as carboxylate type, sulfate ester type, sulphonate type and phosphate type.

The above pigment ink may be made as follows. First, to an aqueous medium containing a water-soluble resin as dispersant and water, the above pigment is added and stirred. Then, a dispersing means described later is used to disperse the pigment and a centrifugal separation may be performed as required to obtain a desired dispersed liquid. Next, to this dispersed liquid, a sizing agent and suitably selected additive components described above are added and stirred to produce a pigment ink.

When an alkali-soluble type resin is used as a dispersant, a base needs to be added in order to dissolve the resin. The bases that are preferably used are organic amines, such as monoethanolamine, diethanolamine, triethanolamine, aminomethylpropanol and ammonia, or inorganic bases such as potassium hydroxide and sodium hydroxide.

In the method of making a pigment ink containing a pigment, an aqueous medium containing the pigment is stirred and, prior to dispersion processing, it is effective to perform a mixing for more than 30 minutes. This is because the premixing operation improves a wettability on the pigment surface and promotes adsorption of the dispersant onto the pigment surfaces.

The dispersing machine used during the pigment dispersing processing may be any type of commonly used machine, for example, a ball mill, roll mill and sand mill. Of these the high-speed sand mill is preferably used. Such machines include, for example, Super mill, Sand grinder, Beads mill, Agitator mill, Glen mill, Dyno-mill, Pearl mill and Cobol mill (all tradenames).

Ink jet printing apparatuses applying pigment inks in general select pigments with an optimum grain size distribution to prevent clogging of nozzles as much as possible. To obtain a desired grain size distribution may involve reducing the size of crushing media in the dispersing machine, increasing a charge ratio of the crushing media, prolonging a processing time, slowing an ejection speed, and classifying crushed grains by filter and centrifugal separator. These methods may also be combined as required.

Next, a reaction liquid applicable in this embodiment that reacts with the above pigment ink will be explained. In this specification, the reaction liquid is defined to be a liquid having a component that acts to coagulate a colorant contained in ink. If a pigment ink is used which contains a pigment dispersed by an electric repelling force, the reaction liquid suitably includes a polyvalent metal salt which is a reaction component that eliminates this electric repelling force. The polyvalent metal salt is composed of divalent or higher metal ions and anions that combine with these polyvalent metal ions. Examples of polyvalent metal ions include divalent metal ions such as $Ca^{2+}$, $Cu^{2+}$, $Ni^{2+}$, $Mg^{2+}$ and $Zn^{2+}$, and trivalent metal ions such as $Fe^{3+}$ and $Al^{3+}$. Examples of anions include $Cl^{-}$, $NO^{3-}$ and $SO^{4-}$. To make the reaction occur instantaneously to quickly form a coagulated film, it is desired that a total electric charge concentration of polyvalent metal ions in the reaction liquid be more than twice that of ions of opposite polarity contained in the coloring pigment ink.

Water-soluble organic solvents that can be used as a reaction liquid include, for example, amides such as dimethylformamide and dimethylacetamide; ketones such as acetone; ethers such as tetrahydroflane and dioxane; polyalkyleneglycols such as polyethyleneglycol and polypropyleneglycol; alkyleneglycols such as ethyleneglycol, propyleneglycol, butyleneglycol, triethyleneglycol, 1,2,6-hexanetriole, thiodiglycol, hexyleneglycol and diethyleneglycol; lower alkylethers of polyvalent alcohol such as ethyleneglycol methylether, diethyleneglycol monomethylether and triethyleneglycol monomethylether; monovalent alcohols such as ethanol, isopropylalcohol, n-butylalcohol and isobutylalcohol; and glycerin, N-methyl-2-pyrrolidone, 1,3-dimethyl-imidazolydinone, triethanolamine, sulfolane, and dimethylsulfoxide. Although there is no particular limitations on the content of the above water-soluble organic solvent in the reaction liquid, it is preferably 5-60 wt % of the total weight of the reaction liquid and more preferably 5-40 wt %.

To the reaction liquid, additives such as viscosity adjusting agent, pH adjusting agent, preservative and antioxidant may be added as required. The selection of surfactant that functions as a penetration accelerator and the amount of surfactant as additive requires caution in restricting the penetrability of the reaction liquid into the print medium. Although the reaction liquid is preferably colorless, it may be light-colored to such a degree that it will not change the tone of the coloring inks when it is mixed with the inks on the print medium. Further, the properties of the above reaction liquid are preferably adjusted so that its viscosity at around 25° C. is in a range of 1-30 cps.

Figure 16A:
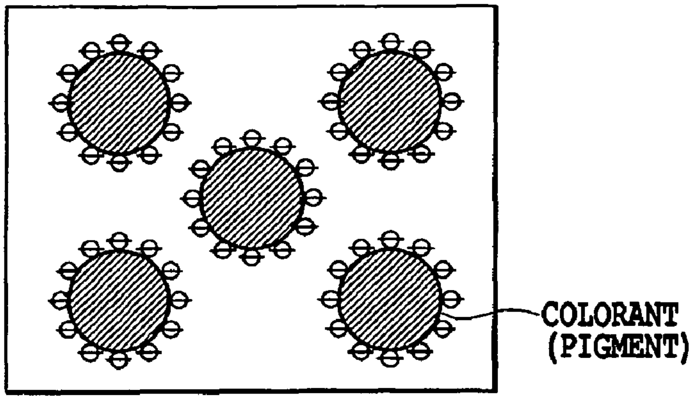
FIGS. 16A to 16C are diagrams explaining an effect of steric hindrance caused by a coagulating inhibitor.
Figure 16B:
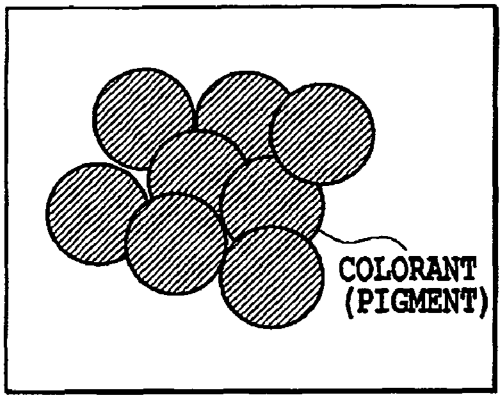

Next, a coagulation inhibitor applicable in this embodiment will be explained. FIGS. 16A and 16B are diagrams showing the effect of steric hindrance brought about a coagulation inhibitor. As shown in FIG. 16A, the colorant (pigment) particles are dispersed in the liquid by electric repulsive force. Before the pigment ink is ejected or discharged from the print head, namely, when the pigment particles are in the liquid, their state is as shown in FIG. 16A. When the pigment ink is ejected from the print head toward the absorber, because of penetration and evaporation of the liquid, the dielectric constant of the liquid is lower, and the electric repulsive force is smaller. As such, the attracting force of Van der Waars is larger than the electric repulsive force, the pigment coagulates and remains near the surface of the absorber (FIG. 16B). As the liquid penetrates into the absorber, the solid particles are separated from liquid.

Figure 16C:
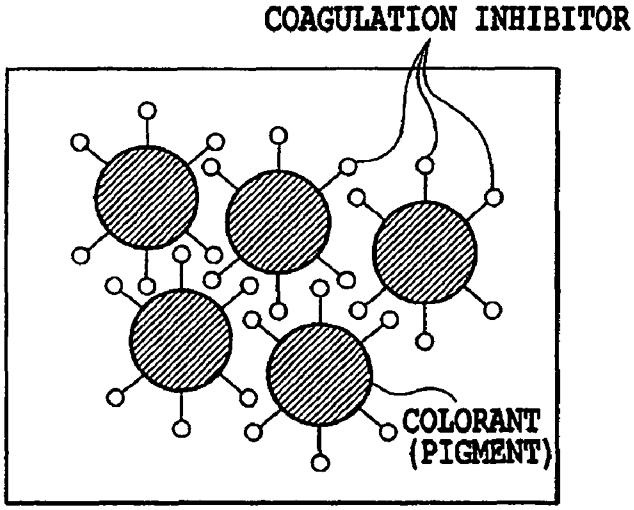

This embodiment, therefore, uses a coagulation inhibitor that inhibits contact among pigment particles (this is hereinafter referred to as an effect of steric hindrance) to minimize the coagulation of colorant on the ink absorber and thereby alleviate the deposit of the ink on the ink absorber. More specifically, a coagulation inhibitor is prepared which can adsorb to the surface of the pigment particles and act to block the pigment particles from contacting one another as shown in FIG. 16C and this coagulation inhibitor is applied to the ink absorber at specified times. As a result, if the pigment ink is applied to the ink absorber, the coagulation inhibitor adsorbs to the surface of the pigment particles preventing the contact among the pigment particles. The pigment therefore is able to maintain its dispersion state stably not dependent on the penetration and evaporation of liquid. The pigment particles therefore are made unlikely to coagulate, alleviating the ink deposit on the ink absorber.

When a reactive ink is used, the reaction and coagulation of the colorant can also be inhibited by making polyvalent metal salt contained in the reaction liquid insoluble in the ink. Examples of such materials include alkaline water solutions such as sodium hydroxide, lithium hydroxide and magnesium hydroxide. It is also possible to use a chelating agent that masks a particular metal. Example chelating agents include EDTA (ethylenediaminetetraacetic acid), NTA (nitrilotriacetic acid) and UDA (uramildiacetic acid).

It is noted, however, that the coagulation inhibitor applicable in this invention is not limited to those having the above effect of steric hindrance or those capable of preventing the polyvalent metal salt in the reaction liquid from being dissolved. In effect, the coagulation inhibitor needs only to be able to inhibit the coagulation of a colorant that tends to coagulate. So, it does not matter whether the means employed takes advantage of the effect of steric hindrance, chemical reactions or other chemical effects.

The coagulation inhibiting liquid may contain water or water-soluble organic solvents. Applicable water-soluble organic solvents include, for example, alkylalcohols with a carbon number of 1-4, such as methylalcohol, ethylalcohol, n-propylalcohol, isopropylalcohol, n-butylalcohol, sec-butylalcohol and tert-butylalcohol; amides such as dimethyl formamide and dimethyl acetamide; ketones or ketoalcohols such as acetone and diacetone alcohol; ethers such as tetrahydrofuran and dioxane; polyalkyleneglycols such as polyethyleneglycol and polypropyleneglycol; alkyleneglycols with alkylene group having 2-6 carbon atoms, such as ethyleneglycol, propyleneglycol, butyleneglycol, triethyleneglycol, 1,2,6-hexanetriole, thiodiglycol, hexyleneglycol, and diethyleneglycol; glycerin; lower alkylethers of polyvalent alcohols such as ethyleneglycol monomethyl (or ethyl) ether, diethyleneglycol methyl (or ethyl) ether, and triethyleneglycol monomethyl (or ethyl) ether; and N-methyl-2-pyrrolidone, 2-pyrrolidone, and 1,3-dimethyl-2-imidazo-lidinone. Of these many water-soluble organic solvents, polyvalent alcohols such as diethyleneglycol, and lower alkylethers of polyvalent alcohols such as triethyleneglycol monomethyl (or ethyl) ether are suitably applied.

A content of the above water-soluble organic solvents in the coagulation inhibiting liquid is generally in a range of 3-50 wt % of the total weight of the coagulation inhibitor inhibiting liquid and more preferably in a 3-40 wt % range. A water content is 10-90 wt % of the total weight of the coagulation inhibiting liquid and preferably 30-80 wt %.

Besides being a colorless, transparent liquid, the coagulation inhibiting liquid that inhibits the coagulation of ink according to this invention may be lightly colored, containing colorants such as dyes and pigments.

Figure 12:
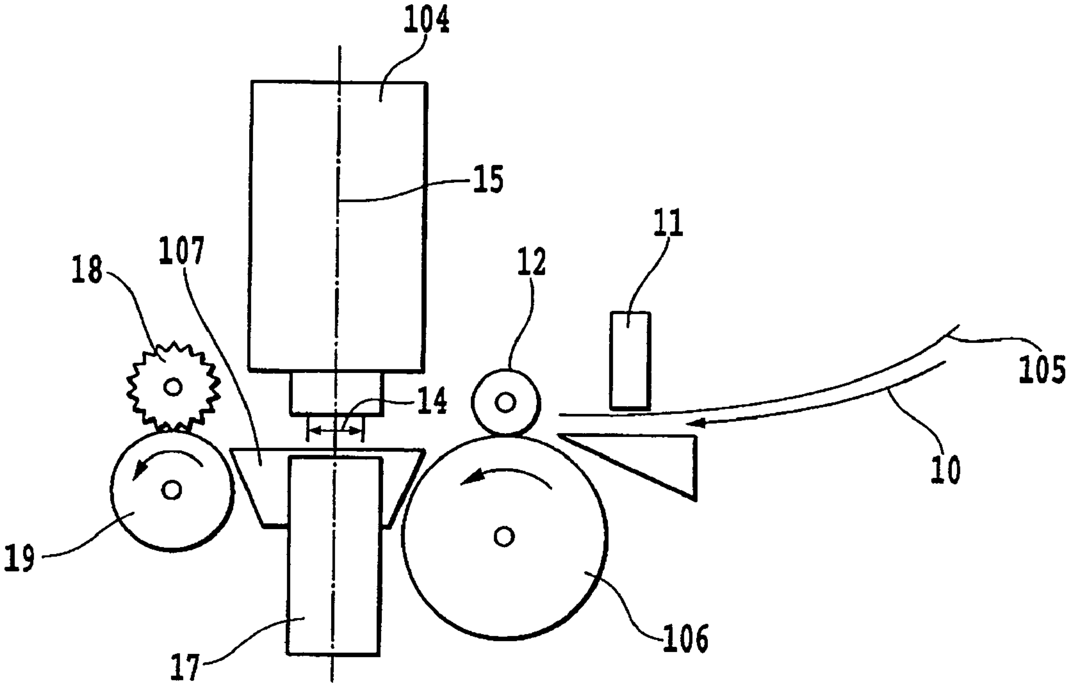
FIG. 12 is a cross-sectional view showing a detail of a printing unit in the printing apparatus of the embodiment of this invention.
Figure 13:
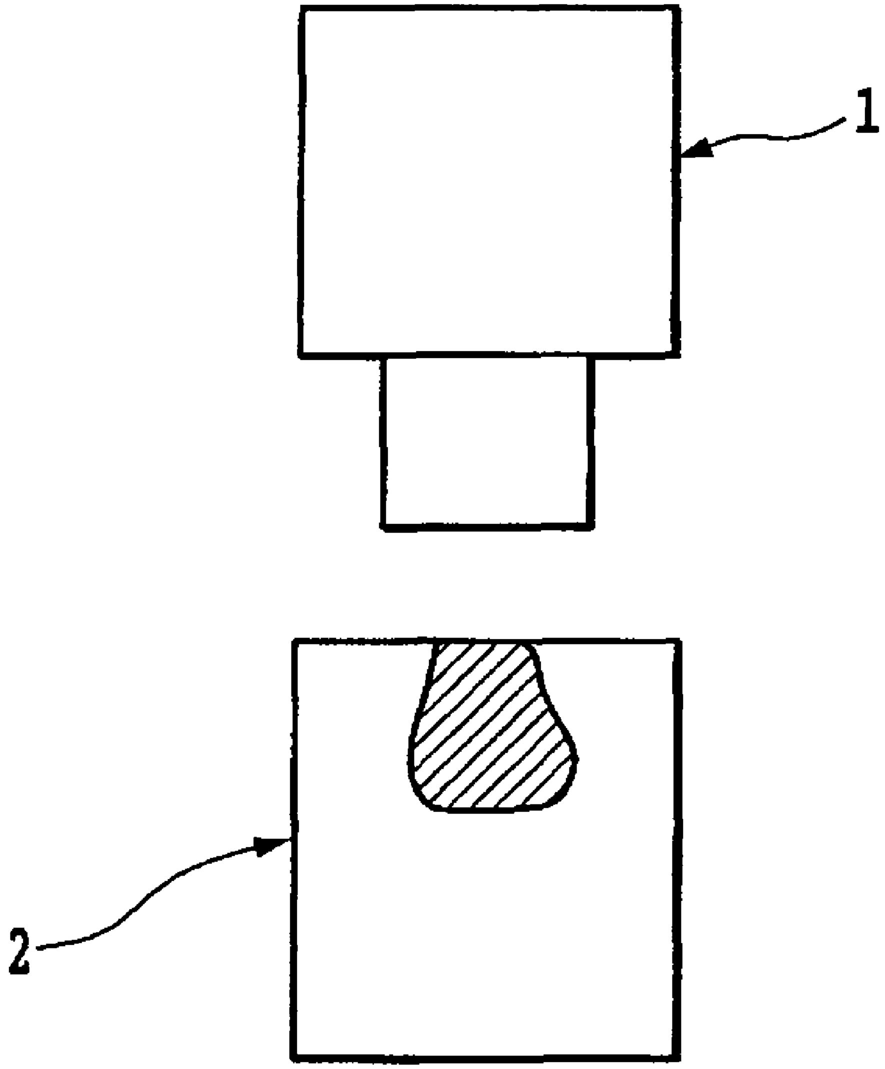
FIG. 13 is a schematic diagram showing a dye ink ejected onto an absorber.
Figure 14:
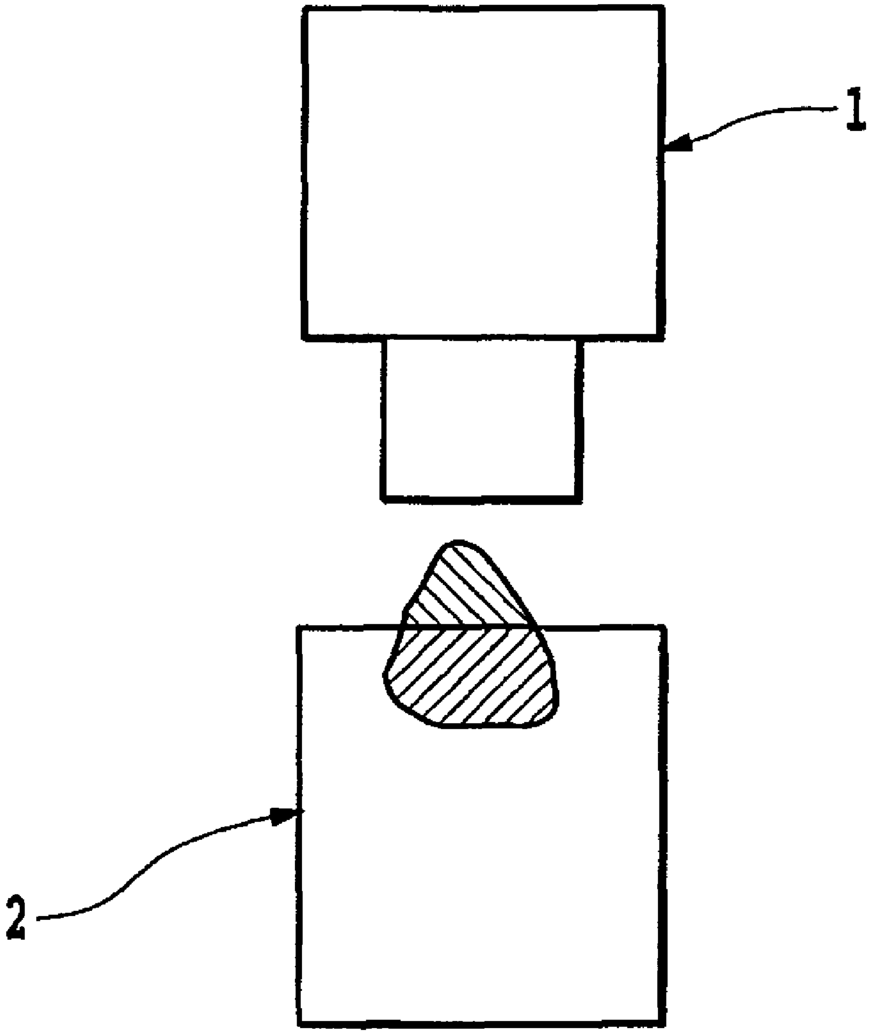
FIG. 14 is a schematic diagram showing a pigment ink ejected onto the absorber.

FIG. 12 is a cross-sectional view showing details of the printing unit in the printing apparatus of this invention. The printing apparatus of this invention can execute a marginless print mode, by which a printing operation is done without leaving a margin at least one of edges (front, rear, right side and left side edges). The apparatus has an ink absorber to receive ink that was ejected outside the edges of the print medium in this marginless print mode. A variety of methods may be conceived in setting the "marginless print mode". For example, on a property window of the printer driver in the host computer, the user may select the "marginless print mode" to cause the selected mode to be set, or may select the "marginless print mode" by using the display screen and switches on the printing apparatus to cause the selected print mode to be set.

In FIG. 12, denoted by 10 is a transport path of the print medium. When a print start command is issued, the print medium 105 is fed in the direction of arrow along the transport path 10. Designated as 11 is a paper sensor. The paper sensor 11 detects the presence or absence of the print medium 105 to determine whether the paper feed operation has been done normally. In the case of the "marginless printing," the front end of the print medium 105 is detected and, based on this timing, the distance that the print medium is transported and the printing method can be controlled. The front end of the print medium thus transported is held between a pinch roller 12 and a transport roller 106 and in this state is transported to below the print head 104 by the rotation of the transport roller 106 and then is positioned at the center 15.

A printable area 14 represents an area where the printing operation is performed by using a plurality of nozzles arrayed on the print head 104. The center position 15 represents the center of the printable area 14. The print medium 105 transported here is supported from below by the platen 107 so that an appropriate distance is kept between the print medium and the nozzle surface. The platen 107 has a hole at the central part thereof facing the printable area 14 of the print head 104. An ink absorber 17 is provided at the hole position as shown.

The print medium with its front end positioned at the center 15 is subjected to a first scan by the print head 104. In the case of the "marginless printing," ink and coagulation inhibiting liquid are ejected from the print head 104 onto areas outside the front edge and side edges of the print medium. The ink and the coagulation inhibiting liquid land on the ink absorber 17 installed at the center of the platen and are absorbed therein. After one printing scan is executed, the print medium is fed a predetermined distance to an area where the next printing scan is to be performed. By repetitively alternating the printing scan and the print medium feeding, the ink can be applied both to an area outside the front edge and side edges of the print medium and to an area inside these edges. Once such a printing scan is under way, the reaction liquid begins to be ejected. In this example, the reaction liquid is ejected in a way that keeps the amount of the liquid ejected outside the print medium as small as possible.

As the printing operation proceeds, an image is formed successively on the print medium. The print medium formed with an image is held between a spur 18 and a discharge roller 19 and moved toward a paper discharge unit. When the paper sensor 11 detects the rear end of the print medium as the printing operation proceeds, a predetermined number of transport operations are performed, at which time the rear end of the print medium is situated directly below the printable area. Then, the rear end is printed in a way similar to that of the front end, with the ink and the coagulation inhibiting liquid ejected outside the rear edge of the print medium absorbed into the ink absorber 17.

Figure 15:
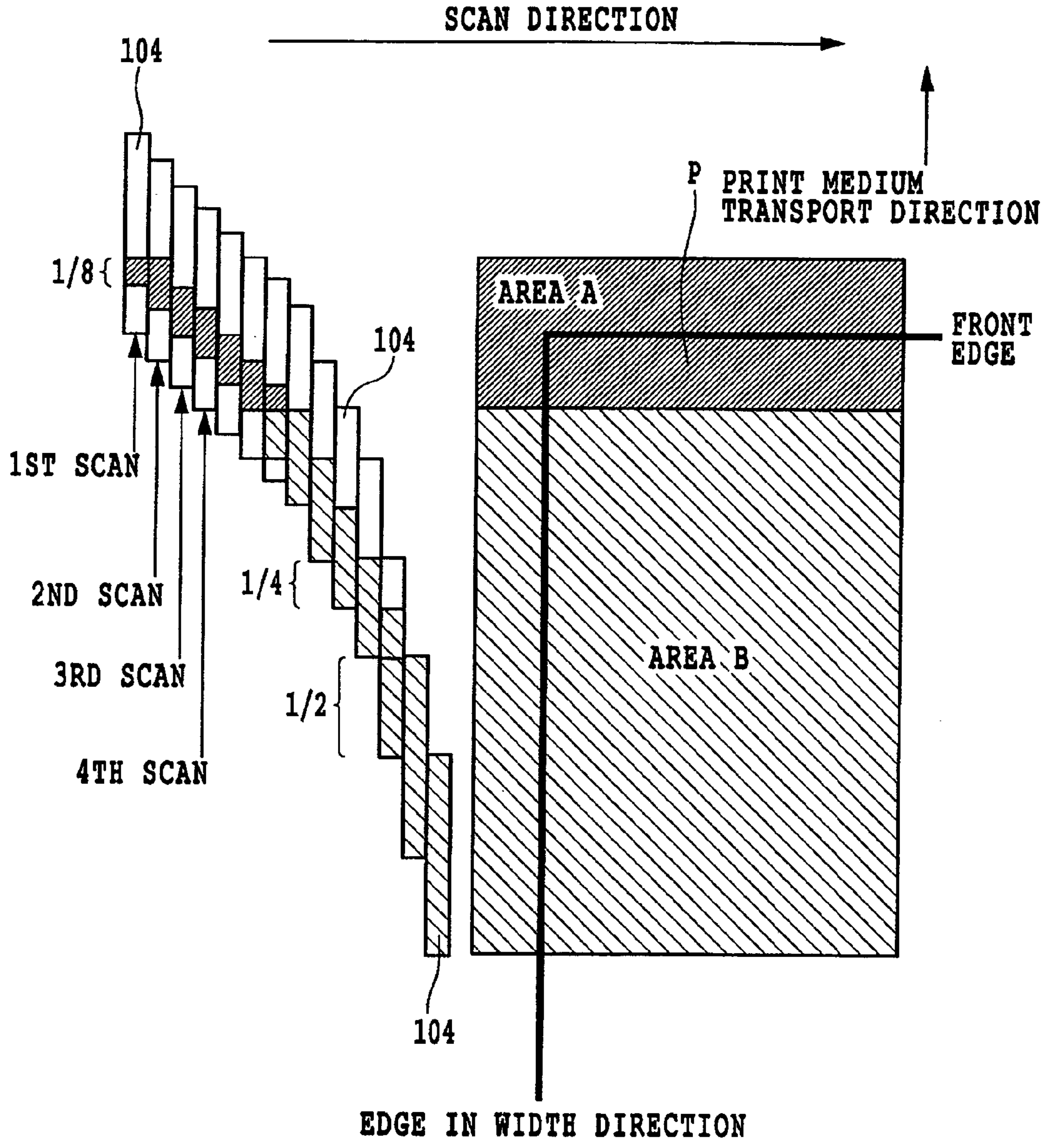
FIG. 15 is a diagram showing how the printing operation is performed during the "marginless printing."

FIG. 15 shows how the printing operation is performed during the "marginless printing." In particular, FIG. 15 shows the printing operation at the front edge and side edge of the print medium. An area A represents a front end area, which is made up of an area outside the front edge and side edges of the print medium and an area inside these edges. An area B represents a non-front end area. A shaded portion of the print head 104 represents a range of nozzles used in each printing scan.

As shown in the figure, this embodiment adopts a so-called 2-pass printing, in which the print head is scanned twice over the same row of pixels in each area to complete the printing of the pixel row. Here, to print the same pixel row with different nozzles, the print medium is fed in the transport direction between the successive scans so that different nozzles face the same pixel row. Although the print head position is shown to change in each scan, this is for the sake of simplicity. In reality, the print head 104 stays at a fixed position in the transport direction and the print medium P is moved in the print medium transport direction (a direction perpendicular to the print head scan direction) by a distance corresponding to the range of nozzles used.

The first to third scans shown in FIG. 15 are those that eject ink only onto the area outside the front edge of the print medium. Thus, during such scans, the coagulation inhibiting liquid is also ejected together with the ink. More specifically, the coagulation inhibiting liquid is ejected to the area outside the front edge of the print medium. During the first to third printing scans, the ink and the coagulation inhibiting liquid that were ejected outside the print medium land on the ink absorber 17 and are absorbed therein.

A fourth scan ejects ink both onto the area outside the front edge and side edges of the print medium and onto the area inside these edges. Thus, as described above, during this scan the coagulation inhibiting liquid and the reaction liquid are ejected in addition to the ink. More specifically, the coagulation inhibiting liquid is ejected to the area outside the front edge and side edges of the print medium and the reaction liquid is ejected to the area inside the edges. The ink and the coagulation inhibiting liquid ejected outside the print medium during the fourth scan land on the ink absorber 17 and are absorbed therein as in the first to third scans. The reaction liquid, since it is not ejected outside the print medium, does not land on the ink absorber in principle. However, if there are print medium transport errors or ejection position errors, the reaction liquid may inadvertently be ejected outside the print medium and land on the ink absorber. In this embodiment, since the coagulation inhibiting liquid is applied to the ink absorber, it can inhibit a reaction on the absorber between the ink and the reaction liquid.

In a fifth and the following scan, ink is ejected to the area outside the side edges of the print medium and to the area inside the side edges. In these scans also, the coagulation inhibiting liquid and the reaction liquid are ejected in addition to ink, as in the fourth scan. Now, the printing on the front end area of the print medium is completed. As in the front end area printing, the printing on the rear end area of the print medium involves ejecting the ink and the coagulation inhibiting liquid to the outside of the print medium and the ink and the reaction liquid to the inside of the print medium.

With the above construction, it is possible to provide a step of applying the coagulation inhibiting liquid to the ink absorber situated directly below the print head and a step of executing the ink application to the edges of the print medium above the ink absorber. With this arrangement, the coagulation inhibiting liquid can be applied to the ink absorber prior to (or almost at the same time as) the application of the ink and the reaction liquid. Thus, the colorant in the ink quickly penetrates into the interior of the absorber without coagulating on the absorber surface. As a result, the depositing of the colorant on the absorber surface can be minimized, alleviating problems associated with it.

Since the coagulation inhibiting liquid is designed to inhibit the coagulation of the ink colorant in the absorber, it only needs to be applied to the absorber without regard to the image being printed. The application of the liquid is preferably done by the print head as in this embodiment. This invention, however, is not limited to this method. For example, the coagulation inhibiting liquid may be applied as by a spray means prior to the printing to produce a satisfactory effect.

In this embodiment, the coagulation inhibiting liquid is applied to the absorber by the print head in the same way as when ejecting ink. Therefore, when executing the "marginless printing," the coagulation inhibiting liquid needs only to be ejected toward the ink absorber located outside the print medium. Considering print medium position deviations during the print medium feeding and printing errors, the coagulation inhibiting liquid may be applied to an area near the edge of the print medium, more specifically, an edge-vicinity area including an area inside the edge of the print medium and an area outside the edge. At this time, it is preferred that the amount of liquid applied to the outside of the print medium be controlled to be greater than that applied onto the print medium.

As to the reaction liquid, since the reaction liquid is designed to improve the quality of image, it should be ejected toward the inside of the print medium, rather than toward the absorber. As described above, the reaction liquid is preferably applied to where the ink is applied, or a part of where the ink is applied, or an entire surface of the print medium. In this embodiment, since the coagulation inhibiting liquid is applied to the ink absorber, should the reaction liquid be applied to the ink absorber, the ink can be inhibited from reacting with the reaction liquid on the absorber and solidifying there. However, applying the reaction liquid to the absorber has no merit at all, so it is preferably ejected only onto the print medium. In this embodiment, therefore, the reaction liquid is not ejected outside the print medium. However, considering the print medium position deviations during feeding and the printing errors, the reaction liquid may be applied to an area near the edge of the print medium, more specifically, an edge-vicinity area including an area inside the edge of the print medium and an area outside the edge.

Second Embodiment

While in the first embodiment an example of using the reaction liquid has been described, the use of the reaction liquid for coagulating the colorant is not essential. This is because the effect of this invention can be produced as long as an arrangement is made to ensure that the colorant contained in ink which has a property to coagulate on the ink absorber can be inhibited from coagulating by the coagulation inhibiting liquid. An example of such an ink is a pigment ink containing a pigment.

In this embodiment also, the coagulation inhibiting liquid is applied outside the print medium during the "marginless printing", as in the first embodiment. In this construction, as in the first embodiment, the coagulation inhibiting liquid is applied to the ink absorber prior to the ink (or almost simultaneously). Therefore, the colorant in ink is quickly soaked into the absorber without coagulating on the surface of the absorber. As a result, the depositing of the colorant on the absorber surface is minimized, alleviating the problems associated with the colorant deposit.

A verification example and a comparison example implemented by the inventors of this invention to confirm the effects of this invention will be explained in the following. In the following description, parts and percent are based on weight unless otherwise specifically stated.

(Verification 1)

According to a process described below, pigment inks of black, cyan, magenta and yellow containing pigments and anionic compounds were produced. A reaction liquid to accelerate the coagulation of pigments in the pigment inks and a coagulation inhibiting liquid to inhibit the coagulation of the pigments of these pigment inks were also made.

(Coloring Ink K1)

<Making Pigment Dispersion Liquid>

Styrene-acrylic acid-ethylacrylate copolymer (acid value 240, weight-averaged molecular weight=5,000) 1.5 parts Monoethanolamine 1.0 part Diethyleneglycol 5.0 parts Ion-exchanged water 81.5 parts The above components were mixed together and heated to 70° C. in water bath to completely dissolve resin component. To this solution, 10 parts of newly prepared carbon black (MCF88, Mitsubishi Kasei make) and one part of isopropylalcohol were added; and they were subjected to 30 minutes of premixing and then to dispersion processing under the following conditions.

Dispersion machine: sand grinder (Igarashi Kikai make)

Crushing media: zirconium beads 1 mm in diameter

Charging factor of crushing media: 50% (by volume)

Crushing time: 3 hours

They were also subjected to a centrifugal separation processing (12,000 rpm for 20 minutes) to remove coarse particles to make a pigment-dispersed liquid.

<Making Coloring Ink K1>

Using the above dispersion liquid, components having the following composition ratio were mixed to manufacture an ink containing a pigment for use as a coloring ink.

The above pigment-dispersed liquid 30.0 parts

Glycerin 10.0 parts

Ethyleneglycol 5.0 parts

N-methylpyrrolidone 5.0 parts

Ethylalcohol 2.0 parts

Acetylenol EH (Kawaken Fine Chemical) 1.0 part

Ion-exchanged water 47.0 parts (Coloring Ink C1)

10 parts of carbon black (MCF88, Mitsubishi Kasei make) used to make the coloring ink K1 was used in place of Pigment Blue 15 to make a coloring ink C1 in the same way as manufacturing the coloring ink K1.

(Coloring Ink M1)

10 parts of carbon black (MCF88, Mitsubishi Kasei make) used to make the coloring ink K1 was used in place of Pigment Red 7 to make coloring ink M1 in the same way as manufacturing the coloring ink K1.

(Coloring Ink Y1)

10 parts of carbon black (MCF88, Mitsubishi Kasei make) used to make the coloring ink K1 was used in place of Pigment Yellow 74 to make coloring ink Y1 in the same way as manufacturing the coloring ink K1.

(Coagulation Inhibiting Liquid P1)

The following components were mixed and dissolved and then filtered under pressure by a membrane filter with a pore size of 0.22 μm (product name: Floropore Filter, Sumitomo Denko make) to produce a coagulation inhibiting liquid P1.

<Composition of Coagulation Inhibiting Liquid P1>

Diethyleneglycol 10.0 parts
Methylalcohol 5.0 parts
BC40 (Nikko Chemical make) 10.0 parts
Acetylenol EH (Kawaken Fine Chemical) 0.1 part
Ion-exchanged water 74.9 parts (Reaction Liquid S1)

The following components were mixed and dissolved and then filtered under pressure by a membrane filter with a pore size of 0.22 μm (product name: Floropore Filter, Sumitomo Denko make) to produce a reaction liquid S1 with its pH adjusted to 3.8.

<Composition of Reaction Liquid S1>

Diethyleneglycol 10.0 parts
Methylalcohol 5.0 parts
Magnesium nitrate 3.0 parts
Acetylenol EH (Kawaken Fine Chemical) 0.1 part
Ion-exchanged water 81.9 parts Next, the four coloring inks, the coagulation inhibiting liquid P1 and the reaction liquid S1 manufactured as described above were poured into empty ink tanks in order to have them ejected from a print head of an ink jet printing apparatus BJF900 (Canon make). The reaction liquid S1 was poured into an ink tank of BCI-6BK (Canon make), the coagulation inhibiting liquid P1 into an ink tank of BCI-6PC (Canon make), the coloring ink K1 into an ink tank of BCI-6PM (Canon make), the coloring ink C1 into an ink tank of BCI-6C (Canon make), the coloring ink M1 into an ink tank of BCI-6M (Canon make), and the coloring ink Y1 into an ink tank of BCI-6Y (Canon make). After this, these tanks are mounted on a tank holder of BJF900. Mounting these inks in the above combinations allows the reaction liquid S1, the coagulation inhibiting liquid P1 and the coloring inks to be applied in that order to a print medium when printing an image during a one-way printing.

Then, the BJF900 was connected to the host computer and controlled according to a printing method, which differs from that used in the product apparatus, to perform a "marginless printing". Here, the printing method that differs from that used in the product apparatus means generating ejection data, not related to the image data for the four coloring inks, to eject the coagulation inhibiting liquid P1 and the reaction liquid S1. In this verification example, ejection data was generated which causes the coagulation inhibiting liquid P1 to be applied to an area 2 mm wide inwardly and 5 mm wide outwardly from the edge of the print medium and which causes the reaction liquid S1 to be applied to the entire surface of the print medium.

Under the printing control described above, a "marginless printing for entire surface" was selected in the printer driver of BJF900, an "overrunning width" was set to the maximum, and a professional photopaper of 2L size (PR101 2L, Canon make) was chosen. Then, a sample image ISO/JIS-SCID (N3 fruit) was printed on 500 sheets continuously in "marginless print mode".

As a result, no ink was deposited on the ink absorber. Therefore, the back of print medium was not contaminated, nor was any print medium transport anomaly observed.

Although in this verification example the ejection data for the coagulation inhibiting liquid and the reaction liquid were generated unrelated to the image data for ink, other arrangements may be made. If the ejection data is made in connection with the ink image data (for example, when binary ejection data for the reaction liquid is generated from a logical OR of CMYK binary image data), a satisfactory result such as described above can be obtained, i.e., ink deposition on the absorber can be prevented.

(Verification 2)

This example has a similar configuration to the verification 1 except that the reaction liquid S1 is not used. In this example, a sample image ISO/JIS-SCID (N3 fruit) was "marginless-printed" on professional photopaper of 2L size. The coagulation inhibiting liquid P1 was applied to an area 2 mm wide inwardly and 5 mm wide outwardly from the edge of the print medium, as in verification 1. As a result, no ink was deposited on the ink absorber. Therefore, the back of print medium was not contaminated, nor was any print medium transport anomaly observed.

(Verification 3)

Using the four coloring inks and the coagulation inhibiting liquid P1 manufactured in verification 1, the "marginless printing" similar to that of verification 2 was executed. As for the coagulation inhibiting liquid P1 of this verification example, the liquid was first applied to one page prior to applying the pigment inks. Then, for the blank print medium that was applied with the coagulation inhibiting liquid P1 at its edge portion, a "marginless printing on entire surface" was selected in the printer driver of BJF900. With an "overrunning width" set to maximum, the coloring inks (K1, C1, M1, Y1) were printed. Such a printing was done continuously on 500 sheets of professional photopaper of 2L size. As a result, no ink was deposited on the ink absorber. Therefore, the back of print medium was not contaminated, nor was any print medium transfer anomaly observed.

(Comparison 1)

This example has a similar configuration to the verification 1 except that the coagulation inhibiting liquid P1 is not used. In this example, a sample image ISO/JIS-SCID (N3 fruit) was "marginless-printed" successively on 500 sheets of professional photopaper of 2L size.

Ink deposit was observed on the ink absorber. Sheets of print medium that were applied ink in the second half of the printing operation were found to be contaminated at their back.

(Comparison 2)

This example has a similar configuration to the verification 1 except that the coagulation inhibiting liquid P1 and the reaction liquid S1 are not used. In this example, a sample image ISO/JIS-SCID (N3 fruit) was "marginless-printed" successively on 500 sheets of professional photopaper of 2L size.

Ink deposit was observed on the ink absorber. Sheets of print medium that were applied ink in the second half of the printing operation were found to be contaminated at their back.

As described above, this embodiment provides a step of applying the coagulation inhibiting liquid to the ink absorber that is placed in an area of the platen situated directly below the print head. With this arrangement, if a “marginless printing” is performed using inks that have a property of coagulating, the ink that was ejected outside the print medium can be quickly absorbed in the absorber, allowing an image to be produced in good condition.

Other Embodiments

In the above embodiments, a serial type ink jet printing apparatus has been explained as one example. In the configuration of the preceding embodiments, the nozzle columns for ejecting coloring inks and the nozzle column for ejecting the coagulation inhibiting liquid have been described to be arranged parallel with each other in the main scan direction on the carriage. During the printing near the edge of the print medium, these nozzle columns eject their own droplets. The present invention, however, is not limited to this configuration. For example, prior to supplying a print medium sheet, it is possible to move the carriage and at the same time apply a relatively large amount of coagulation inhibiting liquid to the ink absorber. Then, the print medium is supplied and the carriage is moved over the supplied print medium to eject ink onto the print medium to form an image.

Further, this invention can also be applied to a full line type print head, in which nozzles are arrayed over the entire width of the print medium, and still the intended effect can be produced.

Further, while in the preceding embodiments an example printing apparatus of the ink jet printing system has been described which utilizes a thermal energy to form flying droplets for image formation, other type of printing apparatus may be used. For example, the printing apparatus may have nozzles that use electromechanical transducers, such as piezoelectric elements, to eject flying droplets for printing.

Whatever ejection system is used to form an image, the effect of this invention can be produced in an ink jet printing apparatus as long as the apparatus uses an ink that tends to coagulate and prints an image on a print medium up to its edges with no margin left at the edges.

With this invention, the coagulation of the colorant on the surface of an absorber can be inhibited, allowing the colorant to be soaked quickly into the absorber. Because the colorant is prevented from being deposited on the surface of the absorber, the problems associated with the colorant deposition can be alleviated. Thus, if a “marginless printing” is performed, an image can be produced in good condition without contaminating the interior of the printing apparatus or the back of the print medium.

The present invention has been described in detail with respect to preferred embodiments, and it will now be apparent from the foregoing to those skilled in the art that changes and modifications may be made without departing from the invention in its broader aspect. It is the intention, therefore, in the appended claims to cover all such changes and modifications as fall within the true spirit of the invention.

This application claims priority from Japanese Patent Application No. 2004-336367 filed Nov. 19, 2004, which is hereby incorporated by reference herein.

What is claimed is:

1. An ink jet printing method for printing an image on a print medium using a print head, the ink jet printing method comprising:

a step of providing (i) an ink containing a pigment for ejection through the print head, (ii) a reaction liquid containing polyvalent metal salt that acts to coagulate the pigment contained in the ink, and (iii) a coagulation inhibiting liquid, including an alkaline water solution, used to inhibit a reaction of the pigment and the reaction liquid by making the polyvalent metal salt contained in the reaction liquid insoluble in the ink;

a step of applying the coagulation inhibiting liquid to an ink absorber, wherein the ink absorber receives the ink ejected outside the print medium; and a printing step of ejecting the ink and the reaction liquid toward the print medium without leaving a margin at an edge portion of the print medium after the coagulation inhibiting liquid application step.

2. An ink jet printing method according to claim 1, wherein the coagulation inhibiting liquid application step is executed by ejecting the coagulation inhibiting liquid from the nozzles to outside the print medium, and wherein the coagulation inhibiting liquid ejected to outside the print medium is received by the ink absorber.

3. An ink jet printing method according to claim 1, wherein the coagulation inhibiting liquid application step is executed by ejecting the coagulation inhibiting liquid from the nozzles to an edge-vicinity area of the print medium, the edge-vicinity area including an area outside the edge of the print medium and an area inside the edge, and wherein the coagulation inhibiting liquid ejected to the area outside the print medium is received by the ink absorber.

4. An ink jet printing method according to claim 3, wherein the amount of the coagulation inhibiting liquid ejected to a unit area outside the print medium is set to be larger than the amount of the coagulation inhibiting liquid ejected to a unit area inside the print medium.

5. An ink jet printing method for printing an image on a print medium using a print head, the ink jet printing method comprising:

a step of providing (i) an ink containing a pigment for ejection through the print head, (ii) a reaction liquid containing polyvalent metal salt that acts to coagulate the pigment contained in the ink, and (iii) a coagulation inhibiting liquid, including a chelating agent, used to inhibit a reaction of the pigment and the reaction liquid;

a step of applying the coagulation inhibiting liquid to an ink absorber by ejecting the coagulation inhibiting liquid from the print head, wherein the ink absorber receives the ink ejected outside the print medium; and a printing step of ejecting the ink and the reaction liquid toward the print medium without leaving a margin at an edge portion of the print medium after the coagulation inhibiting liquid application step.

6. An ink jet printing method according to claim 5, wherein the chelating agent is NTA (nitrilotriacetic acid).

* * * * *